United States Patent [19]
Cho

[11] Patent Number: 5,968,154
[45] Date of Patent: Oct. 19, 1999

[54] DISTRIBUTED PRIORITY ARBITRATING METHOD AND SYSTEM IN MULTI-POINT SERIAL NETWORKS WITH DIFFERENT TRANSMISSION RATES

[76] Inventor: Jin Young Cho, Buk-gu, Wunam-dong 363 Samho Apt. 3-902, Taehan-Mingu, Kwangju-Kwangyoksi, Rep. of Korea, 500-170

[21] Appl. No.: 08/686,139

[22] Filed: Jul. 24, 1996

[30] Foreign Application Priority Data

Jul. 25, 1995 [KR] Rep. of Korea ..................... 95-21970
May 25, 1996 [WO] WIPO ..................... PCT/KR96/00077

[51] Int. Cl.$^6$ ..................................................... G06F 13/36
[52] U.S. Cl. ..................... 710/119; 710/100; 710/113; 714/708
[58] Field of Search ..................... 395/299, 270, 395/280, 293, 325, 725

[56] References Cited

U.S. PATENT DOCUMENTS

| | | | |
|---|---|---|---|
| 5,088,024 | 2/1992 | Vernon et al. | 395/725 |
| 5,140,680 | 8/1992 | Best | 395/325 |
| 5,193,197 | 3/1993 | Thacker | 395/725 |
| 5,379,434 | 1/1995 | DiBrino | 395/725 |
| 5,430,848 | 7/1995 | Waggener | 395/325 |
| 5,475,850 | 12/1995 | Kahn | 395/290 |
| 5,519,838 | 5/1996 | Ziegler et al. | 395/299 |
| 5,572,686 | 11/1996 | Nunziata et al. | 395/296 |
| 5,581,713 | 12/1996 | Myers et al. | 395/299 |
| 5,623,672 | 4/1997 | Popat | 395/728 |
| 5,745,708 | 4/1998 | Weppler et al. | 395/299 |

*Primary Examiner*—Ayaz R. Sheikh
*Assistant Examiner*—Eric S. Thlang
*Attorney, Agent, or Firm*—Hedman, Gibson & Costigan, P.C.

[57] ABSTRACT

This invention presents the serial arbitration method and system for rapidly and accurately identifying a station with the highest priority when a plurality of stations with different transmission rates are simultaneously requesting the use of a bus in a multi-point communication network where a plurality of communication stations share a common serial bus.

This invention intends to improve the bus throughput by not only avoiding the collision of signals in a common serial bus, but also removing the possibility of arbitration failures when a plurality of contending stations have different transmission rates.

For this purpose, a plurality of contending stations transmit modulated unique identity address serially in a form of self-clocking pulse on the OR-type single channel bus when the arbitration start signal is detected in multi-point networks. The stations that have activated the bus are allowed to participate in the next contention until a station with the highest priority is determined and the others are excluded from the contention by themselves in an asynchronous manner. When the activation timings are exactly the same on the bus, a station with the highest priority is determined by bit-serial comparison.

15 Claims, 33 Drawing Sheets

SERIAL ARBITRATION/COMMUNICATION BUS

FIG.2
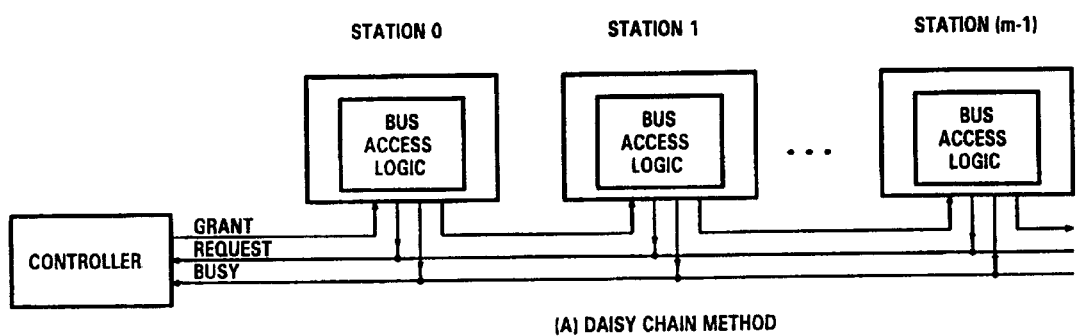
(A) DAISY CHAIN METHOD
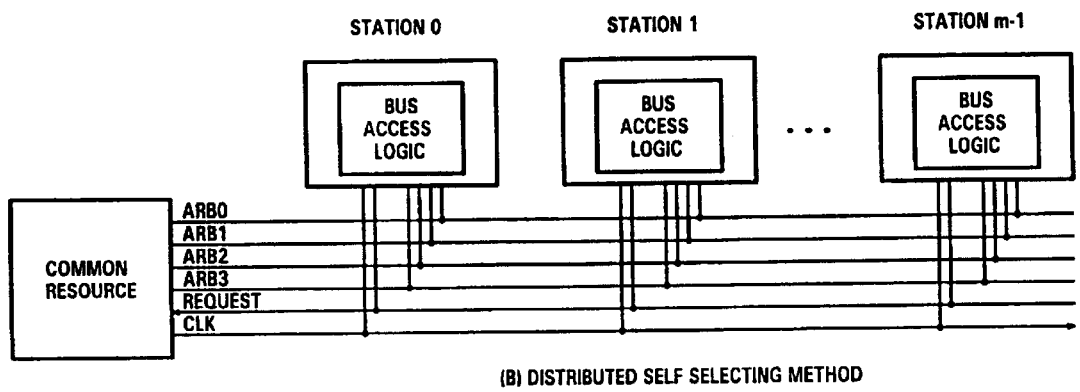
(B) DISTRIBUTED SELF SELECTING METHOD

FIG.5

| STN | ID-Address | | Contention Cycle | | | | Remarks | |
|---|---|---|---|---|---|---|---|---|
| | | | 1 | 2 | 3 | 4 | | |
| S1 | 12 | 1100 | 1 | 1 | 0 | (0)- | withdraw at 4th cycle | 511 |
| S2 | 08 | 1000 | 1 | (0)- | - | - | withdraw at 2nd cycle | 512 |
| S3 | 02 | 0010 | (0)- | - | - | - | withdraw at 1st cycle | 513 |
| S4 | 10 | 1010 | 1 | (0)- | - | - | withdraw at 2nd cycle | 514 |
| S5 | 01 | 0001 | (0)- | - | - | - | withdraw at 1st cycle | 515 |
| S6 | 13 | 1101 | 1 | 1 | 0 | 1 | win | 516 |
| S7 | 04 | 0100 | (0)- | - | - | - | withdraw at 1st cycle | 517 |
| S8 | 11 | 1011 | 1 | (0)- | - | - | withdraw at 2nd cycle | 518 |
| Common Bus | | | 1 | 1 | 0 | 1 | same as 6th station | 519 |
| No. of withdraw Station | | | 3 | 3 | 0 | 1 | | 520 |
| No. of contention Station | | | 8 | 5 | 2 | 1 | | 521 |
| | | | 501 | 502 | 503 | 505 | | |

- : withdraw contention

FIG.6A

| Contention bit / ID-Address | 1 | 2 | 3 | 4 | 5 | 6 | 7 | 8 | 9 | ID-Address [HEX] | REF NO. |
|---|---|---|---|---|---|---|---|---|---|---|---|
| | 7 MSB | 76 | 765 | 7654 | 76543 | 765432 | 7654321 | 76543210 | | | |
| 11111111 | 1 | 11 | 111 | 1111 | 11111 | 111111 | 1111111 | 11111111 | Done | FF | 610 |
| 11111110 | 1 | 11 | 111 | 1111 | 11111 | 111111 | 1111111 | 11111110 | withdraw | FE | 611 |
| 1111110x | 1 | 11 | 111 | 1111 | 11111 | 111111 | 1111110 | withdraw | | FC-FD | 612 |
| 111110xx | 1 | 11 | 111 | 1111 | 11111 | 111110 | withdraw | | | F8-FB | 613 |
| 11110xxx | 1 | 11 | 111 | 1111 | 11110 | Withdraw | | | | F4-F7 | 614 |
| 1110xxxx | 1 | 11 | 111 | 1110 | Withdraw | | | | | E0-EF | 616 |
| 110xxxxx | 1 | 11 | 110 | Withdraw | | | | | | C0-DF | 617 |
| 10xxxxxx | 1 | 10 | Withdraw | | | | | | | 80-BF | 618 |
| 0xxxxxxx | 0 | Withdraw | | | | | | | | 00-7F | 619 |
| Common Bus | 1 | 11 | 111 | 1111 | 11111 | 111111 | 1111111 | 11111111 | 11111111 | | 620 |
| No. of Group | 9 | 8 | 7 | 6 | 5 | 4 | 3 | 2 | 1 | | 621 |
| | 630 | 631 | 632 | 633 | 634 | 635 | 636 | 637 | 638 | 639 | 640 |

| Contention bit / ID-Address | 1 | 2 | 3 | 4 | Contention Cycle | | | | | ID-Address [HEX] | REF NO |
|---|---|---|---|---|---|---|---|---|---|---|---|
| | | | | | 5 | 6 | 7 | 8 | Done | | |
| | 7 | 76 | 765 | 7654 | 76543 | 765432 | 7654321 | 76543210 | | | |
| | MSB | 6 | 5 | 4 | 3 | 2 | 1 | 0 | | | |
| 00000000 | 0 | 00 | 000 | 0000 | 00000 | 000000 | 0000000 | 00000000 | 00000000 | 00 | 650 |
| 00000001 | 0 | 00 | 000 | 0000 | 00000 | 000000 | 0000000 | 00000001 | withdraw | 01 | 651 |
| 0000001x | 0 | 00 | 000 | 0000 | 00000 | 000000 | 000001 | withdraw | | 02-03 | 652 |
| 000001xx | 0 | 00 | 000 | 0000 | 00000 | 000001 | withdraw | | | 04-07 | 653 |
| 00001xxx | 0 | 00 | 000 | 0000 | 00001 | Withdraw | | | | 08-0F | 654 |
| 0001xxxx | 0 | 00 | 000 | 0001 | Withdraw | | | | | 10-1F | 655 |
| 001xxxxx | 0 | 00 | 001 | Withdraw | | | | | | 20-3F | 656 |
| 01xxxxxx | 0 | 01 | Withdraw | | | | | | | 40-7F | 657 |
| 1xxxxxxx | 1 | Withdraw | | | | | | | | 80-FF | 658 |
| Common BUS | 0 | 00 | 000 | 0000 | 00000 | 000000 | 0000000 | 00000000 | | | 659 |
| No. of Group | 9 | 8 | 7 | 6 | 5 | 4 | 3 | 2 | 1 | | 660 |

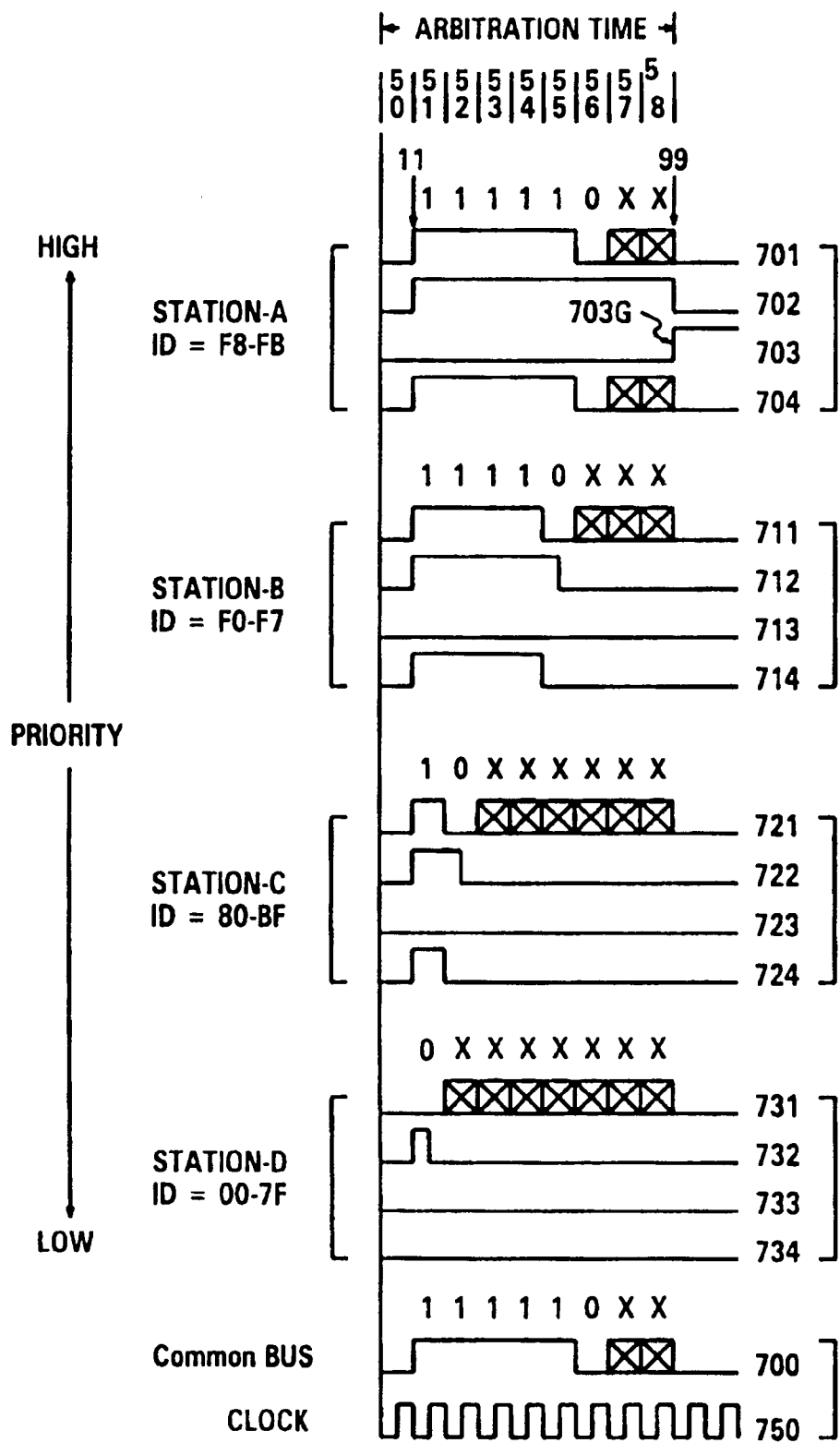

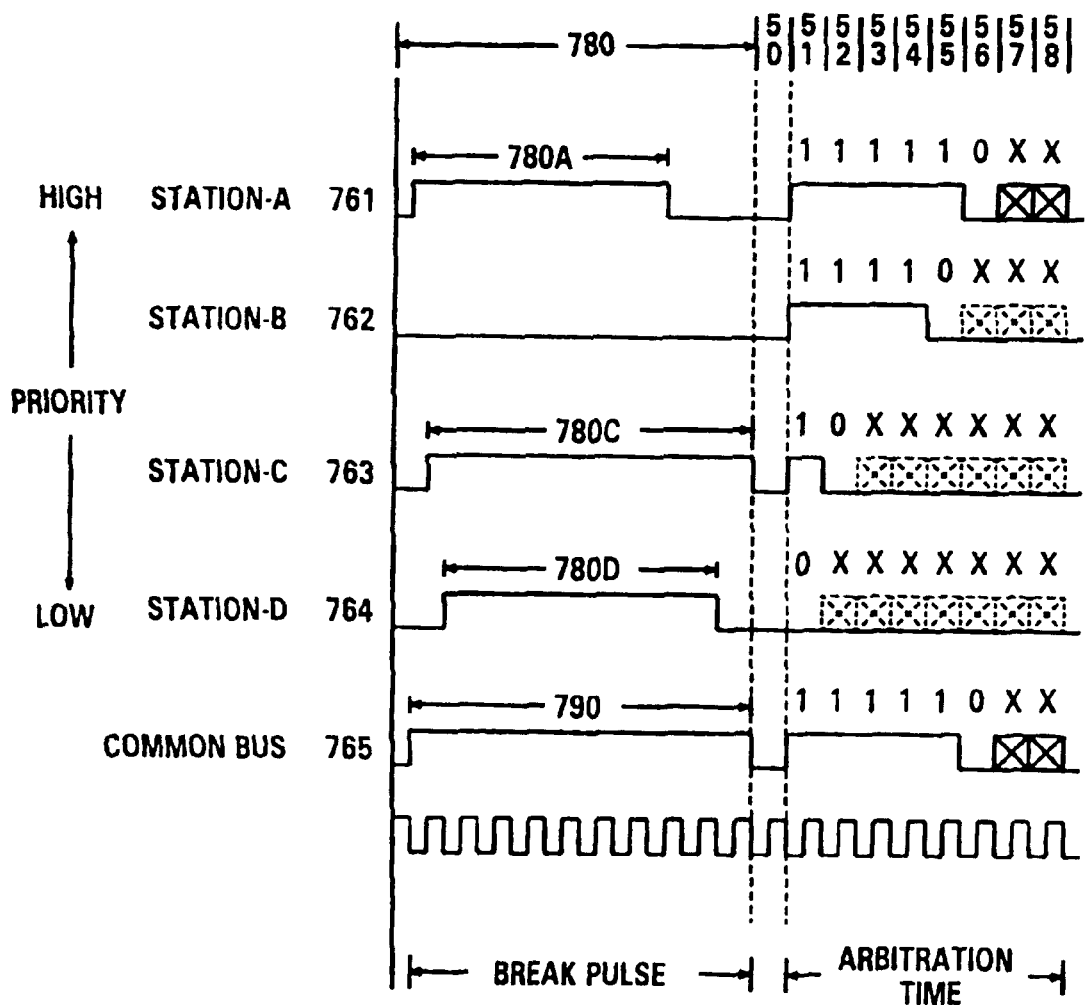

FIG. 14B
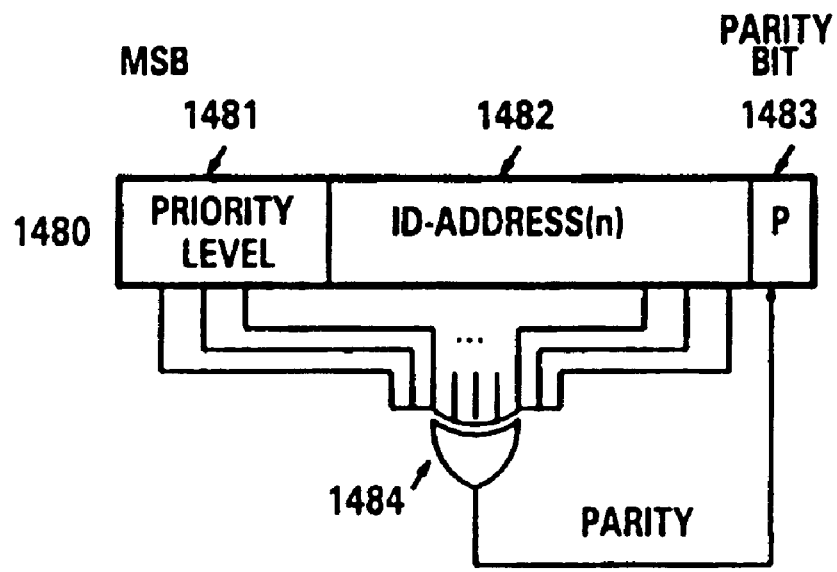
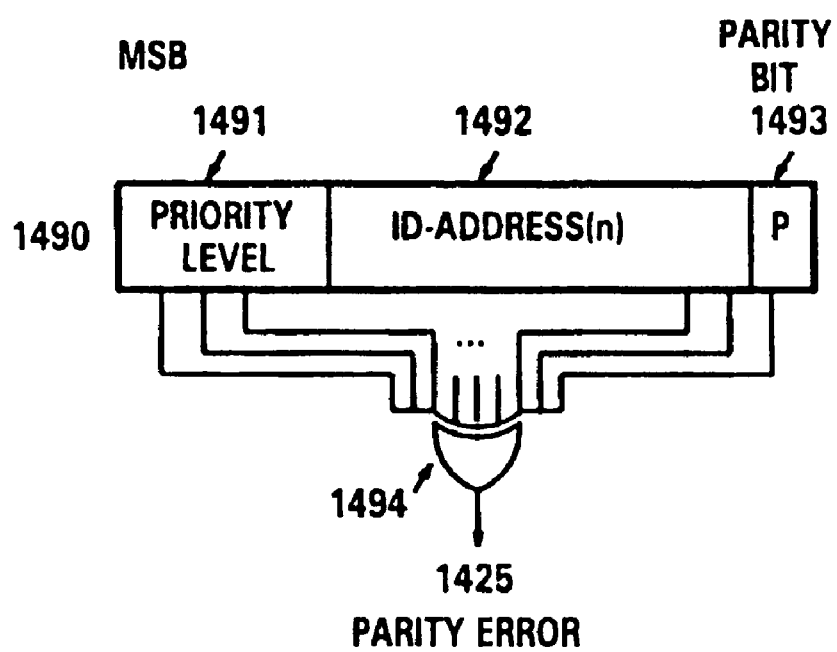

Centralize Clocked Serial Arbitration System

Distribut Clocked Serial Arbitration System

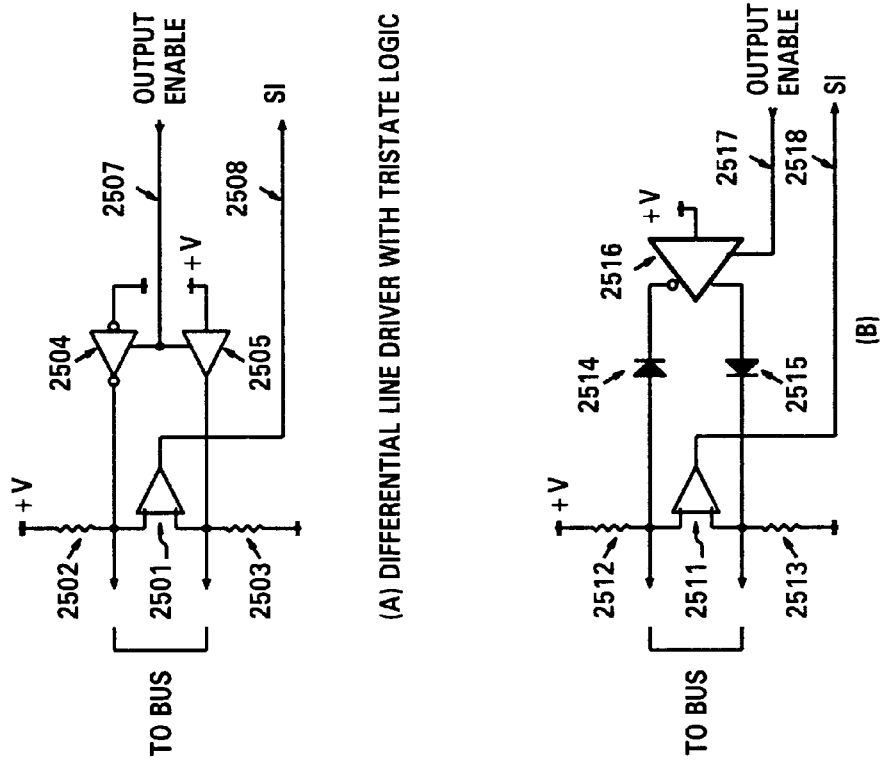
FIG. 25 (A) DIFFERENTIAL LINE DRIVER WITH TRISTATE LOGIC

DISTRIBUTED PRIORITY ARBITRATING METHOD AND SYSTEM IN MULTI-POINT SERIAL NETWORKS WITH DIFFERENT TRANSMISSION RATES

BACKGROUND OF THE INVENTION

1. Field of the Invention

The present invention constitutes a Distributed Serial Arbitration System thereof for rapidly and accurately identifying a station having the highest priority when a plurality of stations request the use of the common bus simultaneously in a multipoint, multiple access system having a common bus or communications link shared by a plurality of communication stations.

The present invention also concerns the method of self-selecting distributed arbitration that quickly identifies the station which has requested the use of the common bus service with the minimum number of needed lines in a multipoint network, as well as the method for ensuring the fairness of arbitration.

2. Description of the Prior Art

As computer systems and networks become complex and the volume of data for distributed and/or parallel processing increases, the method for allocating the common resource usage affects the overall performance of the entire system significantly.

Common resources of a system are connected via communication channels or buses. Therefore, bus arbitration plays a very important role of allocating the bus usage among stations which complete for usage of such common resources.

In computer systems, there exists various stages of buses among stations (or processors) and each processor in a multiple processor system approaches the common memory or other common resources via a common bus system.

A bus is a communication highway which connects two or more stations. There are various types of buses, from a bus which is used for communication among different parts of a system to the type used for communication among different processor systems which are located over remote areas in a network.

A bus is an electrical conductor. Simply speaking, a bus is a parallel lines that is used to transmit a specified number of signals according to its limited form of data or address. A bus normally uses DC logic levels, but may use other transmit methods such as carrier modulation and other methods that employ light waves or wireless signals so as not to permit signal quality degradation due to a transmission medium.

For a station to communicate with another, it sends a signal that calls for the other's response. Such a signal is called an 'identity-address.' The station that initiates communication is referred as a master and one which responds a slave. Stations in a system can be either a master or a slave at different points in time.

Only one station can use a bus at a time. When two or more stations want to use the bus, there needs to be a procedure to grant the bus access in some way. Such a procedure is called bus arbitration.

In general, two factors are important in granting bus access to stations in any bus arbitration method. The first factor is priority. Each station has a unique priority value and the station with a higher priority obtains the bus access. The second factor is fairness. The bus access needs to be distributed fairly to all stations desiring to use the bus.

Detailed descriptions on buses and bus arbitration methods are included in references [1]–[3].

Bus arbitration methods are categorized into four types:

In Daisy Chain Arbitration methods, all stations that need bus access are arranged in a serial connection. The station with the highest priority is located in the nearest position to the arbiter and the stations are sequentially arranged according to the descending order of priority so that the one with the lowest priority is located in the furthest position. Bus access is allocated according to physical proximity to the arbiter and a priority structure is fixed in the implemented hardware.

The methods of Daisy Chain Arbitration are simple and therefore, economic. They, however, have serious drawbacks as follows: First, when stations with higher priorities dominate the bus access, fairness in bus allocation is difficult to achieve. Secondly, because stations are physically connected in a serial manner, physical lines are cumbersome to implement. Also, when a station in the middle is removed, an entire daisy chain is disconnected. Thirdly, information regarding bus arbitration is not provided in most all cases. This shortcoming makes monitoring and diagnosing of bus operations difficult.

In Centralized Parallel Arbitration, also called Independent Requesting, each station is connected to an arbiter via two independent lines for bus request and for bus permission, respectively. Thus, for n stations, there needs to be $2^n$ lines for bus arbitration. These methods are quick. efficient, and provide fair arbitration. However, the connection between a central arbiter and each station is complex and costly. When bus requests increase sharply, a bottleneck phenomenon can occur. Also, no information on bus arbitration appears on a bus.

In Distributed Arbitration by Self Selection, also called Parallel Contention, stations requesting bus access produce their ID-address, and the station with the highest priority is determined based on bus inspection. Each station independently determines the station with the highest priority. With these methods, arbitration speed is enhanced but an abundance of lines is required, and bus access is dominated by stations with higher priorities.

In Distributed Arbitration by Collision Detection Methods, each station requests bus access independently. When a plurality of stations request bus access simultaneously, collisions can occur. And one of the colliding stations is selected and is awarded the bus access.

With existing methods it is difficult to expect both economy and fairness. Many methods experience limitations in station expandability. The present invention overcomes all of said deficiencies by developing the Distributed Serial Bus Arbitration System and implementing the apparatus thereof which identifies the station with the highest priority rapidly, realizes the fairness criterion almost perfectly by varying a station priority structure, and enables unlimited expansion in the form of multi-drops, of stations even with different transmit rates.

Furthermore, the bus arbitration method presented in the present invention can be employed for interrupt arbitration by using station ID-address which appear on the common bus. Thus, vectored interrupt arbitration is made possible.

SUMMARY OF THE INVENTION

The present invention pertains to the Distributed Serial Arbitration System thereof which rapidly identifies the station with the highest priority in situations of multiple access requests by a plurality of stations in multipoint networks with limited resources.

The present invention also pertains to the self-selecting distributed serial arbitration method for rapidly identifying stations which request common bus access, as well as the method for ensuring arbitration fairness in multipoint networks.

In order to achieve said goals, the serial arbitration method according to the present invention employs the following scheme: First, in a multipoint network with a plurality of stations each with an n-bit ID-address, arbitration is initiated by an arbitration initiating synchronous signal. The MSB of ID-address of all stations participating in the common bus contention are sent to the common bus and are logically operated. The result of this bus signal is compared to MSB of each participating station's ID-address. Each station either continues to take part in the contention process or is withdrawn from further contention based on the result of this comparison process. Thus, the station with the highest priority among $2^n$ contending stations can be identified after at most n comparisons.

To realize these functions, this invention provides a method of arbitrating communication requests from a plurality of stations in multipoint networks which includes the following components:

a Serial Unit, which outputs ID-address of stations requesting bus access via a said multipoint network, sequentially from MSB to LSB;

a Bus Interface Unit, which performs a logical operation on Serial Unit output from contending stations and activates a common bus with a resulting signal; and a Comparison and Control Unit which compares a signal of the common bus with each Serial Unit output so that, if the Serial Unit Output is not equal to the common bus signal, then the corresponding station is withdrawn from further contention;

Also, according to the present invention, said Serial Unit enables the multipoint network arbitration method so that ID-address of all contending stations are output sequentially from MSB to LSB, simultaneously in a bit-serial form by using shift registers of serial-output nature.

Also, according to the present invention, said Bus Interface Unit enables the multipoint network arbitration method so that electrical collisions, as experienced in many prior arts, are avoided as outputs from said Serial Unit are logically operated and constitute common bus signals, thus a station with the highest priority is determined with a high speed in a single arbitration attempt, and vectored interrupt arbitration is made possible even on the serial bus.

Also, according to an implementation of the present invention, a multipoint network arbitration method is provided so that a modulation unit is included between said Serial Unit and said Bus Interface Unit and a synchronization method is employed to ensure smooth communication over a wide range of signal frequencies, employing modulation methods of Duty Cycle Modulation(DCM), Tri-Level Modulation(TLM), and Manchester Encoding.

Also, according to the present invention, a multipoint network arbitration method is provided so that the ID-address of a station with the highest priority appears on the common bus, thus enabling identification of bus arbitration information by any station on the network. When constructing an interrupt arbitration system, a vectored interrupt arbiter can be constructed even on the serial bus so that address values corresponding to vectors are obtained and an interrupt arbitration module is employed. Such an interrupt priority arbiter is possible with an identical structure as that of a bus arbiter as described previously.

Also, according to the present invention, a multipoint network arbitration method is provided so that the number of failures in bus contention or of bus access grants is counted for each station and a station's priority can be modified dynamically by either increasing or decreasing its transmit rate, or by adding a priority level code. Thus, a station's priority is varied in subsequent arbitration processes, ensuing arbitration fairness.

Also, according to the present invention, a multipoint network arbitration method is provided so that said Comparison and Control Unit inhibits outputting of any signal from the Serial Unit to the common bus, of stations that are withdrawn from bus contention, and generates the common bus approval signal upon completion of all contention cycles.

Also, according to the present invention, methods of solving the synchronization problem during arbitration initiation stage are provided. The first such method is to add a separate dedicated control line, and the second, to implement an arbitration initiation signal as a special pattern within a single arbitration bus. The first method is suitable for situations requiring high-speed arbitration response as well as for perfect arbitration with mutual interference considered. It requires either a plurality of parallel lines, or a separate control line besides the common bus line for transmitting arbitration information. The latter method enables arbitration with only two serial lines, thus advantageous for expansion. It, however, necessitates some time to separate and extract synchronous signals.

Also, according to an embodiment of the present invention, a multipoint network arbitration method is provided so that any station needing arbitration sends an arbitration initiation signal to the common bus whenever needed, thus enabling real-time interrupt requesting without necessitating extra bus, and interrupt arbitration request vector values can be extracted using only one serial line. These characteristics are possible because, when stations with different transmit rates are mutually connected, if the bus is activated longer than a data rate time slot of a station with the lowest transmit rate (that is, the lower limit of transmit rates), then this signal is not viewed as a normal communication signal. This method then can be used to generate an arbitration initiation signal and all stations can be synchronized at an arbitration initiation without requiring the use of any special binary signal patterns.

Said methods above can be applied not only for multipoint serial bus arbitration but also for data transmission wherein stations in multiple access situations which are deemed difficult to transmit data in a normal way can be withdrawn from resource contention, thus avoid communication difficulty due to bus collisions, and ensure communication in at least one channel despite interference during transmission.

BRIEF DESCRIPTION OF FIGURES

Capabilities and advantages of the present invention, summarized above, will become more apparent from a review of the following specifications when taken in conjunction with the drawings in which:

FIG. 2 the prior art.

FIG. 5 is a contention table with eight stations in serial arbitration.

FIG. 6A is a contention table for identifying a maximum value of ID-address.

FIG. 6B is a contention table for identifying a minimum value of ID-address.

FIG. 7A is a timing diagram with four stations according to the present invention.

FIG. 7B is a timing diagram when arbitration starts with break pulse.

FIG. 11A is a block diagram for a serial arbiter embodiment with logical OR.

FIG. 11B is a block diagram for a serial arbiter embodiment with logical AND.

FIG. 14B is an ID-address extension including a priority level code and parity bit for dynamic priority modification.

FIG. 25 is an embodiment of a differential bus driver to apply the present invention.

DETAILED DESCRIPTION OF THE INVENTION

1. Overview

1. Overview of the Present Invention

Figure 1A:
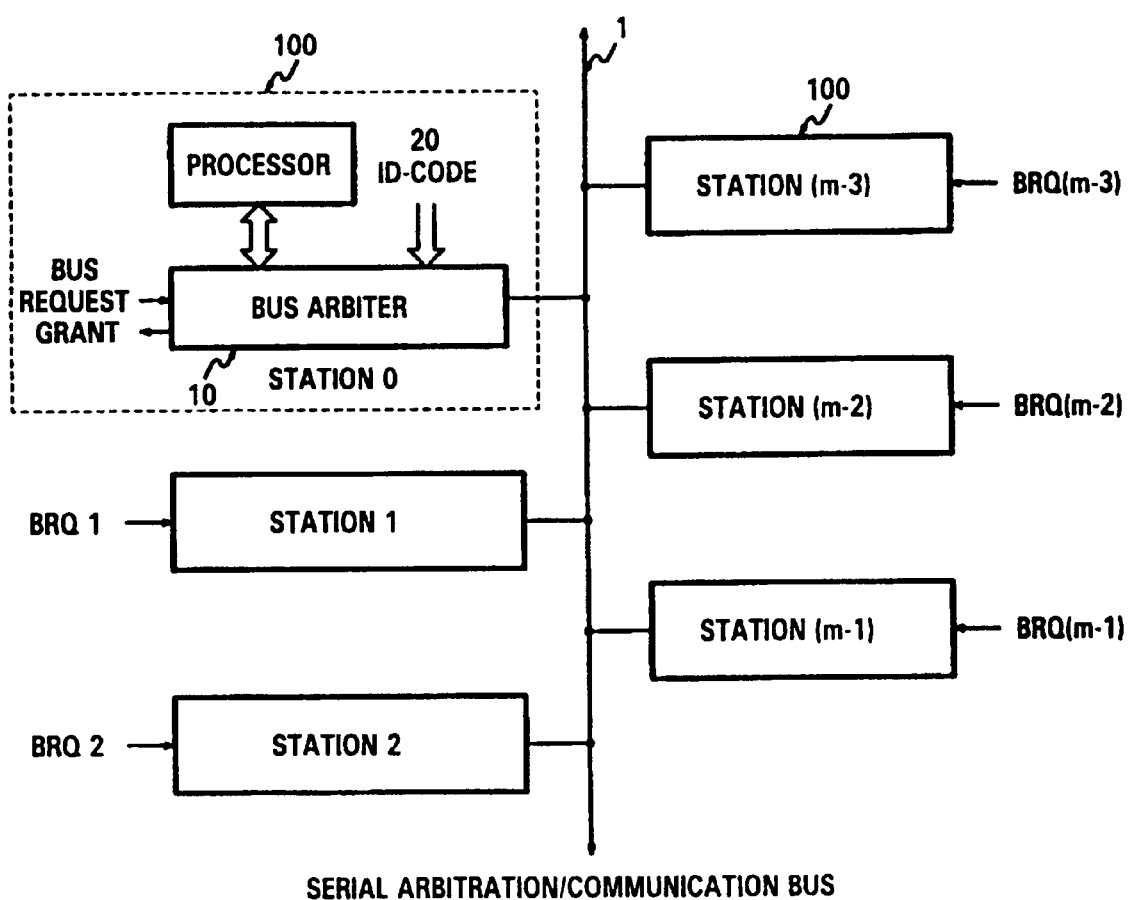
FIG. 1A is a block diagram of the distributed serial bus arbitration system

FIG. 1A is a block diagram of the priority arbitration system with a serial bus structure which is applied to the present invention. The system is a multi-point network which identifies the station with the highest priority among m (at most $2_n$) stations each with a n-bit identity address when they request common bus arbitration. Each station is connected to multipoints via common bus, which is a communication channel used to connect all stations. A bus may take different forms such as an electrical line, wave space, or optical fiber. Their logical operations, however, are all identical. Therefore, their operations are explained using the case of an electrical bus in the present invention.

Each station may make a common bus access request. When a station has the highest priority among all stations in a network, it becomes the 'bus master' according to the priority arbitration method of this invention and exercises a common bus access right.

Figure 1B:
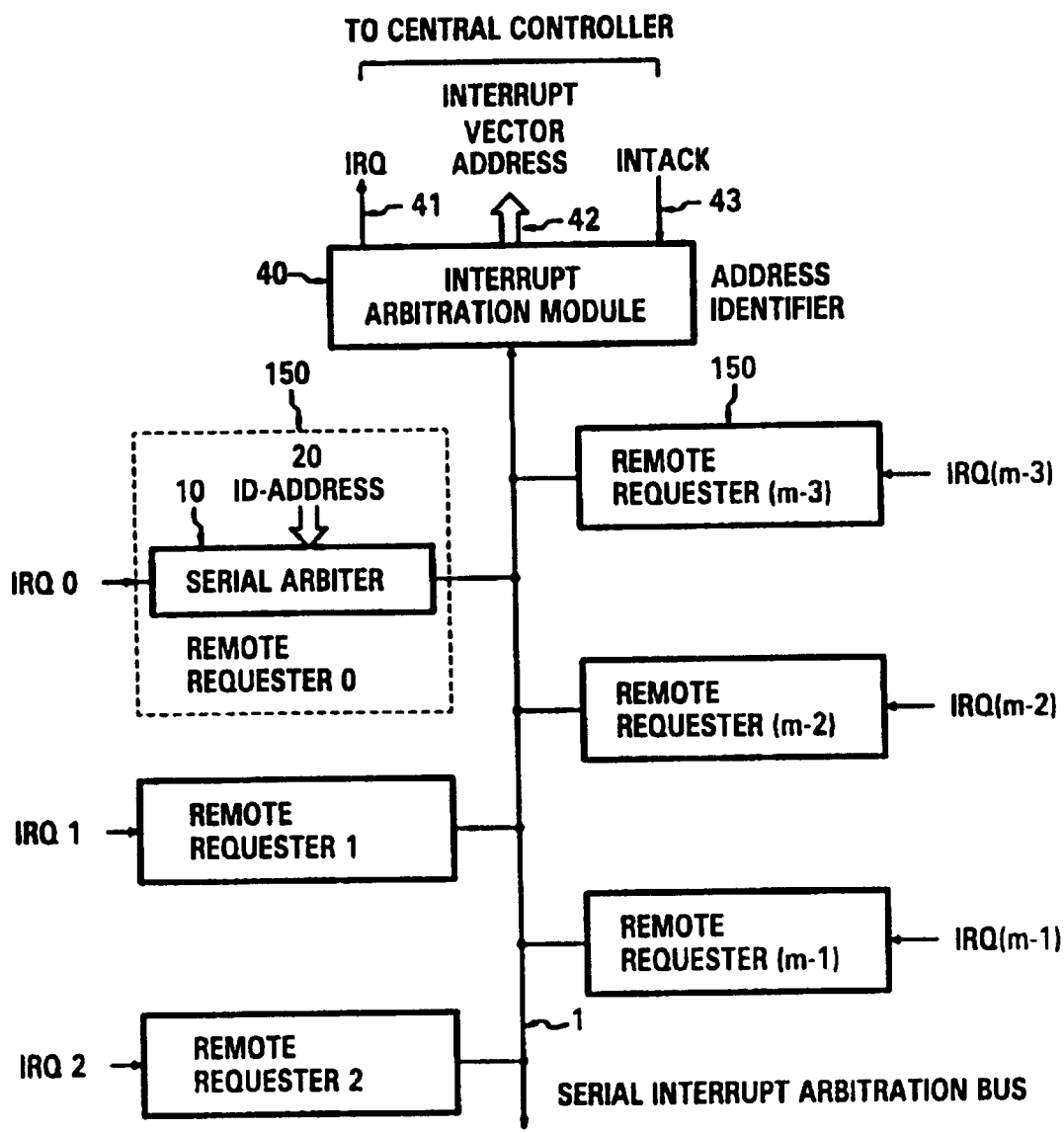
FIG. 1B is a block diagram of the serial interrupt arbitration system

FIG. 1B is a block diagram of a serial interrupt controller of multi-point serial bus structure, embodied according to the present invention.

2. A Serial Bus Structure to Apply the Present Invention

A bus (a communication channel) is a communication route that connects two or more modules (stations). A bus may take a form other than an electrical line such as an electromagnetic space, optical fiber and other various media. In a multi-point digital network where a plurality of systems are connected onto a single bus, a station's transmit signal can be received by other multiple stations connected to the bus. However, when a plurality of stations want to use the bus simultaneously, signals cause collision and are distorted. Therefore, only one station may transmit data via the bus at a time.

When a plurality of signals are mixed, conventionl digital communication networks without logical operations implemented experience signal distortions due to their collision. The signal output of such a network is not determined as a logical value but by the network's electrical property regardless of a transmitted data. On the other hand, stable values of '0' or '1' are assured in networks with logical operations well defined.

When all systems have produced their output signals on a common bus simultaneously, the network structure has to be one that enables defined logical operations without causing electrical problems. In reality, however, many systems are remotely located. Therefore, for many electrical systems, logical operations of 'AND' and 'OR' are performed as in wired logic forms. This manner of wired logical operations can be applied to cases of electromagnetic free space transmission and optical fiber applications.

As bus interface devices to obtain such logical operation results electrically, there are bus drivers of open collector and open drain types as well as electromagnetic wave radiators such as TE, FET, LED, laser, and diodes.

When a plurality of data are serially mixed on a common bus, binary signals related to a particular data appear on the bus sequentially. Hence, each data value can be found.

Although a system has such logical operation capability, if data are fed continually in parallel, the result of an operation is meaningless because a logical '1' takes a priority for 'OR' operation and a logical '0' for 'AND' operation. In these situations, a station's transmit data cannot be obtained from a common bus data. Sequential serial digital data is related to its transmit time in a binary position. Using this property, a transmit data specific value can be found when the transmit device output is self-controlled according to a specified rule.

In multiple access situations, at least bus signal distortion can be prevented if each station is inhibited from transmitting any signal that is not its own. In the present invention, such a bus structure with logical operation capability is employed.

Only four modulation methods are cited for the present invention. However, any expert skilled in the art may understand without difficulty that other modulation methods can be employed in place of those cited herein to perform similar arbitation functions as specified in the present invention.

2. Serial Arbitation

The present invention pertains to a distributed, self-selecting priority arbitration method for multipoint networks with serial bus structures and the apparatus therefor. Each station that enters bus contention has a bus arbitraition circuit and the common bus(1) access is assigned to a station with the highest priority according to the distributed arbitration method of the present invention. Bus arbitration according to the present invention can be implemented using only a single bus arbitration line (that is, common bus). Also, information on what bus has been assigned the bus access can be obtained from the bus.

Figure 3:
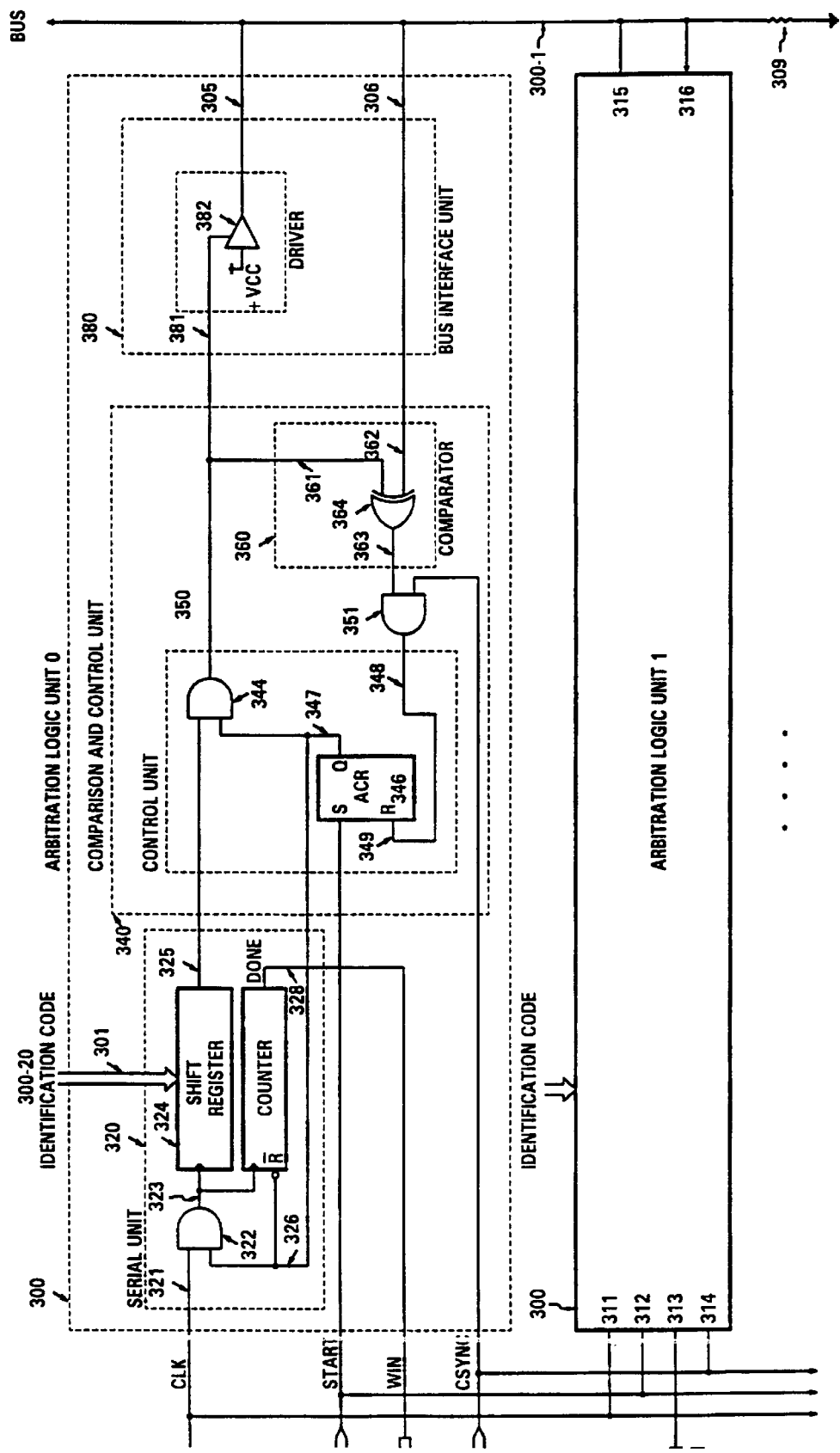
FIG. 3 is a block diagram of a distributed serial arbiter according to the present invention.

FIG. 3 is a basic block diagram of a serial arbitration apparatus according to the present invention.

A serial arbiter for multipoint networks according to the present invention is connected to common bus and is an assembly of the following components:

a Serial Unit(320) which generates a serial bit stream from an ID-address stored in a shift register(324) according to a transmit (clock(323);

a Comparison and Control Unit(340) which compares own output signal(345) with a bus signal(346) to verify their consistency and takes a control action; and a Bus Interface Unit(380) which takes a bit stream(381) as input, outputs it onto common bus(300-1) via a bus driver (382) from which common bus obtains a wired OR of the input signal.

A Serial Unit(320) is an assembly of the following sub-components;

a shift register(324) which converts an input ID-address into a bit stream, a counter(327) which counts the number of bit shifts, and an AND gate(322) which controls a clock(302).

A Comparison and Control Unit (341) is an assembly of the following sub-components:

a comparator(360) which compares own output signal (345) with bus signal (346) to verify their consistency and generates a contention withdrawal signal (363);

an Arbitration Control Register(ACR,346) that operates by an arbitration initiation signal(303) and controls arbitration process; and an AND gate for controlling bit streams of Serial Unit.

A Bus Interface Unit(380) consists of an open-collector type tri-state bus driver(382) of which output activates the common bus(1) only when logical '1' is permitted to the control input.

The workings and method of arbitration according to the present invention can be explained in detail using flowcharts, contention tables. and timing charts as follows:

Referring to FIG. 3, a bus arbiter(300) is an assembly of three logic circuits of a Serial Unit(320), a Comparison and Control Unit(340) and a Bus Interface Unit(380).

In the Serial Unit(320), a station that requests common bus(300-1) access takes the clock signal(302) and sends one bit at a time its ID-address stored in a shift register(324), and the output signal(345) is inhibited by an AND gate(322) when an ACR(346) of the Comparison and Control Unit is reset. The counter(327) counts the number of bits that are output from the shift register(324) each time a clock pulse (323) comes in via the AND gate, beginning with an initialized value. When the counter(327) shows that serial output has been generated for all bits, then it generates an arbitration termination signal (304) that implies that the station obtains the bus access.

A Comparison and Control Unit(340) is composed of control part(350) and comparison part(360). The control part(350) sequentially output the bit stream of ID-address onto the common bus(300-1) through the Bus Interface Unit(380) from the AND gate of the Serial Unit when the arbitration initiation signal(303) sets the ACR(346), and compares bit stream(345) from AND gate of comparison part(360) with bus signal monitored by buffer to verify their consistency. If there were inconsistency, ACR is reseted and inhibits serial output to common bus and reset the counter (327). The comparison part(360) output the signal to reset the ACR of the control part(350) when the activating signal (345) of the bus driver is not equal to the signal(362) of common bus.

A Bus Interface Unit(380) consists of a bus driver(382) that loads a controlled output(345) onto the common bus after the Serial Unit output(325) is input to the Comparison and Control Unit(382). A bus driver(382) takes a controlled ID-address signal(345) as a controlled input signal(381) and outputs a logical OR for each bit of all contending stations onto the common bus(300-1) by using an open-collector type, tri-state buffer(382) to activate the bus.

In the above process, an OR operation is used to give priority, to higher ID-address values and an AND operation can be used to give priority to lower ID-address values.

Figure 4A:
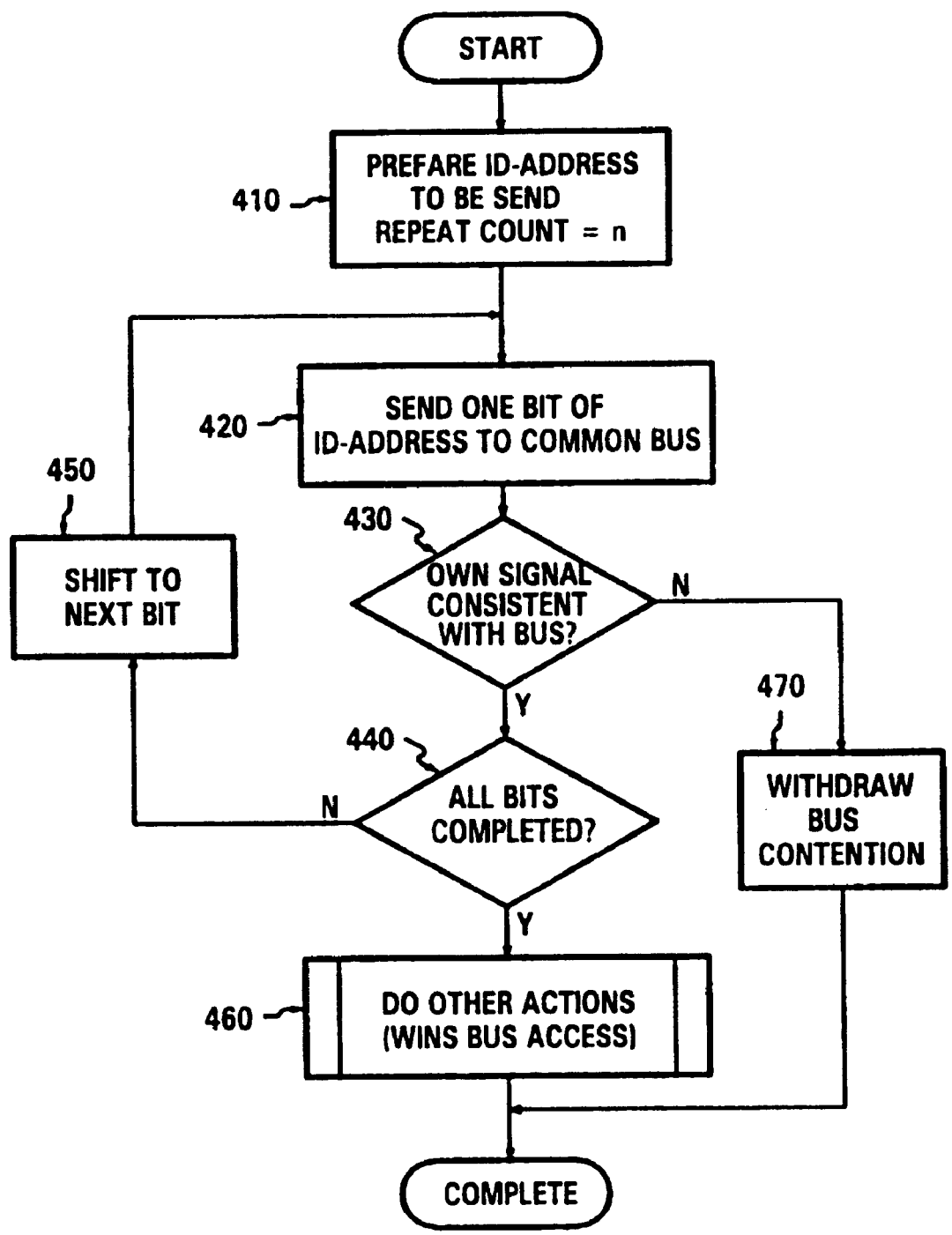
FIG. 4A is a flowchart of the serial arbitration according to the present invention.

FIG. 4A is a flowchart that explains the distributed serial arbitration system according to the present invention. FIG. 5 is a contention table when eight stations enter bus contention each with a four-bit ID-address. FIG. 6 shows a contention process when 256 stations enter contention. each with an eight-bit ID-address. FIG. 7 shows a contention timing diagram for selecting a station with the highest priority among stations with eight-bit ID-address, Workings of a priority arbiter according to the present invention are explained referring to FIGS. 3, 4A, 5, and 7. All bus arbiters for stations connected in a multipoint network have an identical structure and operate in a unified principle.

In the arbitration initiation stage(step 410), bus contention is initiated as a bus arbitration initiation signal(303) sets the ACR(346). Then, the AND gate connected to the output (347) from the ACR(346) becomes operable and the counter (327) is operable as its reset(326) is released, so that, whenever an outside clock signal(302) is permitted, output from the shift register(324) of the Serial Unit(320) is sent sequentially one bit at a time.

In the logical operation stage(step 420), when the method of assigning the highest priority to a station with the greatest ID-address is employed, an OR operation on the bus driver (382) and the common bus(300-1) is performed. Accordingly, a logical sum of all station ID-address appear on the common bus (300-1). When the method of assigning the highest priority to a station with the smallest ID-address is employed, a bus is activated by a logical '0' of the bus driver (382) and a wired AND is formed by grounding the input(389).

In the Comparison and Decision Stage(step 430), the common bus signal and the bit stream(345, 381) of the ID-address that is output from the Serial Unit(320) via the AND gate(345), are compared. In this process, there can be two cases when the two signals do not match, as shown in Table-1(S03, S04). One of these cases is when the bus driver signal is a '0' and the bus '1.' In this case the station's output ID-address value is smaller than that of another. Therefore, such stations(513, 515, 517) must withdraw from bus contention and they reset their ACR(346) in step 470. If an ACR is reset, then the AND gate(322, 344) becomes inoperable and all serial output from this station is inhibited at subsequent clock signals(301). Thus, this station is excluded from bus contention and its shift counter(327) is initialized.

Another such case is when the bus driver's available signal(381) is a logical '1' and the bus signal is a '0.' In this case(S04), there is a problem in the common bus line. In the present invention, when such a problem occurs for a station, it is excluded from bus contention and other actions can be taken if necessary. Arbitration actions according to the bus driver signal(381) and the bus signal(300-1) are reviewed in detail after step 440 is explained. Those stations that are not withdrawn from contention take the following step 440.

In the completion verification stage(step 440), completion of the contention process is verified. If it is not complete, the counter(327) is incremented by one in step 450, the shift register shifts to the next bit to be output, and step 420 is repeated. If a station has completed the contention process to the last bit position without withdrawing in the middle. then an arbitration completion signal (304) is generated and this station S6(516) obtains the bus access. The arbitration information appears on the common bus sequentially. This property is employed in the interrupt arbitration system, introduced later in this invention.

Table 1 shows a truth table of the arbitration process that reviews all possible cases as each station's output control signed (381) and the common bus signal(300-1) are varied.

Serial arbiters(300) according to the present invention have their input/output terminals connected to one common serial common bus via multipoints and their operations are performed in parallel. Based on the common bus data and the serial bit stream(345) of an ACR(346), the ACR output for each combination case appears in Table 1. Here, ACR(t) denotes a current output logical value(347) of the ACR (346). B denotes a logical value(381) of bus driver control input(382), BUS denotes the logical value of the common bus(300-1), and ACR(t+1) denotes the next state logical value of ACR(346).

In state S01, the initial value of ACR is a logical '0.' Therefore, this station has not made any bus request and is not a contending station.

In states S02, S03, S04, and S05, the ACR initial value is a '1' so that this station is a contending station.

In state S02, own bus driver input(381) is B=0, hence is in an inactivating state, and the bus is not activated. Hence, the comparator(360) does not generate a non-consistency signal and the arbitration process proceeds.

In state S03, own bus driver input(381) is B=0 and BUS 1. Hence, the bus has been activated by another station with a higher priority. Therefore, this station resets its ACR(346) and is excluded from further contention.

In state 504, own output(381) is a '1' and the bus signal is a '0.' This combination cannot happen under normal bus driver interface situations. Possible problems with either the driver or the ACR can cause abnormal transfer of electrical signals. Therefore, the ACR is resetted and this station is excluded from further contention and other necessary actions can be taken.

In state S05, own output signal is a '1' and the bus also is a '1.' These two are the same. Both this station and another have sent output to the common bus. Thus, this station continues in the contention process. (At this time, stations which have sent a '0' such as those in either S01 or S02 state have lower priorities. Their ACRs are reset and are excluded from further contention.)

As shown in FIG. 5, in the first comparison cycle, three stations(513. 515, and 517) withdraw from contention and a logical '1'(519) appears on the common bus. In the second comparison cycle, two stations withdraw(512, 514) and '1' appears on the bus. In the third comparison cycle, no stations withdraw and '0' appears on the bus. In the last comparison cycle, two stations(511, 518) withdraw from contention and '1' appears on the bus. S6 has continued in the contention till the final cycle. Hence, it obtains the bus access right(516). Also, the sequential information on the bus is '1101' as in 519 and is the same as the ID-address value of S6(576). This shows that S6 has the highest priority.

To further explain the above process with a timing diagram, FIG. 7 shows a timing diagram of contention actions of stations each with an 8-bit ID-address.

waveforms 701, 711, 721, and 731 are bit streams of each station's ID-address;

waveforms 702, 712, 722, and 732 are ACR values which are output feasible to the bus when their values are a '1';

waveforms 703, 713, 723, and 733 show the bus access approval state for a station with the highest priority;

waveforms 704, 714, 724, and 734 show bit streams of ID-address that are output from contending stations to the common bus; and waveforms 704 is seen to be equal to waveform 700 that appears on the bus when the highest priority station is identified.

FIG. 6A and 6B are tables of contention stages in the case of using 8-bit station addresses and at most 256 contending stations in a multipoint network according to the Distributed Serial Arbitration System according to the present invention. These figures are used to explain the processes of 420 to 460 as illustrated in FIG. 4A.

Assuming that every station having an 8-bit address participates in common bus contention, 128 stations having '0's as their MSBs are withdrawn from bus contention among 256 stations and the other 128 stations having '1's as their MSBs remain in the contention, in stage 1.

Among the 128 participants, at most 64 stations having '0's in the current bit position are withdrawn from the contention, and the remaining stations continue to participate in further contention comparisons. Upon completion of this comparison method in LSB position, only one station with the highest priority (610) gains the access to the common bus.

FIG. 6B depicts the case when a logical value '0' takes priority. Here. the station with the smallest address value (650) obtains the bus access, as according to the method explained for FIG. 6A above.

As can be seen in contention tables of FIG. 6A and 6B, the number of contending stations can be haved according to the priority structure of ID-address.

As explained above, a communication system on a bus has its own unique n-bit ID-address Of $2^n$ possible such stations, it takes n cycles of the operation(420), a comparison and decision stage(430), and a completion verification stage(440) to identify a station with the highest priority. According to the present invention, each station needs an arbiter which compares own signal with the common bus signal to self-determine contention proceed/withdrawal consequence at each comparison cycle. Thus, the arbitration mechanism is not centrally located but is distributed over stations in a network. For this reason, such an arbitration method is called a 'distributed, self-decision serial arbitration by bit comparison.'

3. Modulation Techniques

FIG. 7 is a timing diagram of the non-modulated address bit streams of four stations A–D with 8-bit ID-address at the same transmit rates, in the Priority arbitration Method for multipoint networks according to the present invention.

waveforms in FIG. 7 are explained as follows:

waveforms 701, 711, 721, and 731 denote the bit stream waveforms of ID-address of contending stations A–D;

waveforms 702, 712, 722, and 732 denote the waveforms of ACR and indicate output generation state when logical value is '1';

waveforms 703, 713, 723, and 733 denote the bus access approval result after the highest priority station has been identified;

waveforms 704. 714, 724, and 734 denote bit streams of addresses that are output to the common bus from contending stations;

Waveform 700 denotes bit stream of a station with the highest priority which appears on the common bus(1);

waveform 750 denotes the waveform of a local clock in each station; and

FIG. 7 is a contention timing diagram of four contending stations having the following binary values of ID-address:

```
   MSB --------------> LSB 1 2 3 4 5 6 7 8

A 1 1 1 1 1 0 x x

B 1 1 1 1 0 x x x

C 1 0 x x x x x x

D 0 x x x x x x x
```

Referring to FIG. 7, each station waits for its own bit time in period 50 just after the contention initialization point 10. In period 51, MSBs of contending stations compete with one another. Here, MSB values of stations A, B, and C are '1's, while that of station D is '0'. Thus. stations A, B, and C continue to take part in further contention cycles and station D, having a lower priority level, is withdrawn from subsequent contention cycles. In period 52, the addresses of stations A(700), B(710), and C(720) are shifted to the left, and the respective second bits are subjected to comparison. Since the second bits of stations A, B, and C are '1', '1', and '0', respectively, stations A and B continue their contention and station C withdraws from contention.

In period 53, neither station A nor B are withdrawn from contention, since their third bits are both '1's. In period 54, their fourth bits are both '1's, thus both stations remain in contention as in period 53. In period 55, station A has '1', but station B has '0', hence station B withdraw from contention.

In period 56–58, station A, having gone through the full cycle of said bit comparisons, finally gains the exclusive access to the common bus.

Therefore, as shown in FIG. 7, the bit stream of a common bus signal 700 is entirely equal to that of station A during the arbitration period Thus, station A obtains the bus access.

4. Duty Cycle Modulation (DCM)

Figure 8A:
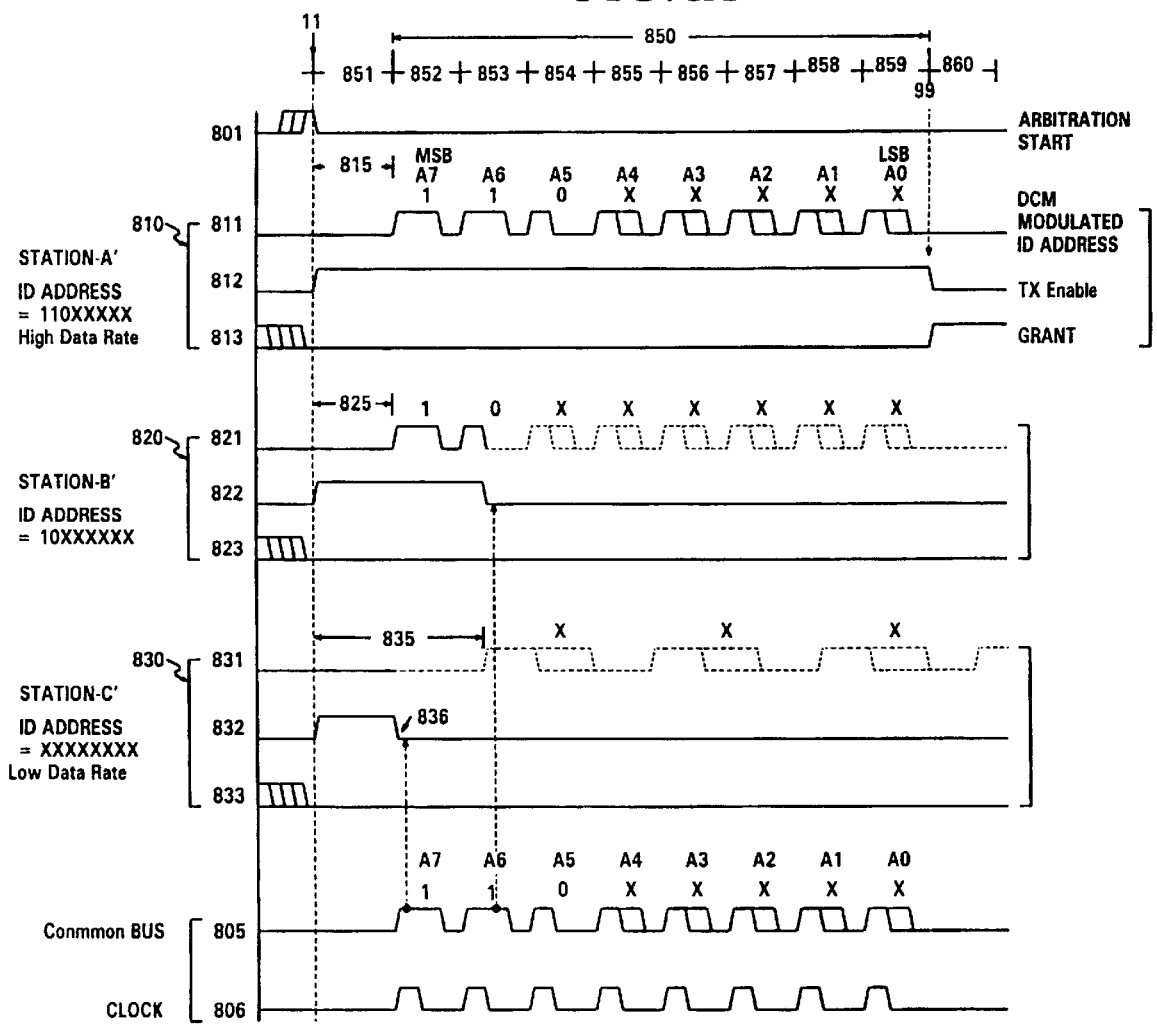
FIG. 8A is a contention timing diagram for the case when Duty Cycle Modulation is performed.
Figure 8B:
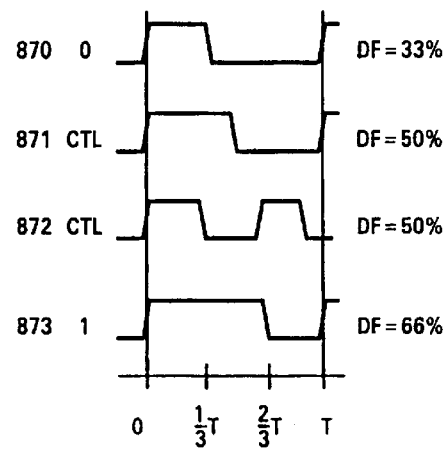
FIG. 8B is a example of duty factor.

FIG. 8A is a contention timing diagram in case of different transmit rates when using DCM of ID-address. Contention begins at the arbitration initiation point(11) and stations with late response times have lower priority and withdraw from contention. And when two or more stations respond simultaneously contention proceeds with binary values of ID-address. An illustrative bit streams of ID-address of three contending stations are illustrated in FIG. 8B.

As with the waveform 870, a 33%-duty factor is defined as '0', and a 66%-duty factor signal such as waveform 873 is defined as '1', to thereby modulate a signal. Using a DCM as defined above, clock signal can be extracted from a transmission signal. Thus, ID-address can be accurately extracted from common bus without a local clock signal.

Waveforms of FIG. 8A are explained as follows:

waveforms 811, 821, and 831 denote the waveforms of the ID-address bit streams of contending stations A'(810), B'(820), and C'(830) and the dotted portions indicate signals after contention withdrawal and which are not outputted onto the common bus;

waveforms 812, 822, and 832 denote ACR waveforms indicating output feasible state when logical '1' appears; and waveform 805 indicates DCM modulated bit streams which appear on common bus (1).

Stations A'(810), B'(820), and C'(830) enter bus contention by way of an arbitration initiation signal. These stations pause for one bit time slot. Pause times differ according to station transmit rates as shown in waveform patterns of 815, 825, and 835.

To summarize the above process; with regards to transmit rates. stations A'(810) and B'(820) are the same but station C'(830) is slower than these. Hence, before MSB of station C' appear during interval 851, those of A' and B' appear on the common bus(1). Thus, station C' withdraws from contention and MSB of its ID-address is not sent to common bus.

Stations A'(810) and B'(820), having the same transmit rates, compete with each other in contention period 852. Here, station B' has bit '0' and station A' has bit '1', that is, station A' has a higher priority, thus excluding station B' from the contention.

In contention period 853 and subsequent contention periods, station A'(810) experiences the above procedure repeatedly until LSB comparison(99). Then, station A' gains the right of exclusive common bus access. Accordingly, only the modulated signal bit stream 811 of station A' appears on the common bus and all other stations remain in output infeasible state.

As can be seen in the above contention process, stations with lower transmit rates do not activate the common bus regardless of their address values. Thus, they are forced out of contention by those stations which activate the bus earlier.

That is, if a station's activation state value appears later than that of the common bus, then the station that is connected to the bus has already occupied the bus and this occupying station takes priority. But even during a transmission state, if the common bus is in an inactivated state and a station's output can activate the bus, then said station can acquire the bus access. When this occurs, the station which has been using the bus loses its bus access. In such a case, ACR value is changed and a communication error has occurred.

In FIG. 8A, the station A'(810) with longer activation time, as shown in time interval 853, obtains the bus access To summarize the above contention process, all contending stations compare own transmit signals with that of the common bus and at the first instance when a station's signal is found to be different from that of the common bus, it withdraws from bus contention.

In the arbitration method according to the present invention, a station whose activation duration is the longest wins the bus access right. A contention start time for all contending stations can be synchronized by using a break pulse to activate a bus longer than the minimum data rate of stations. Hence, any station that needs to use the common bus may request its use anytime.

Also, a bus access request can be made on a real-time basis so that interrupt requesting and arbitration for such requests using serial lines are feasible.

5. Manchester Encoding

Figure 9:
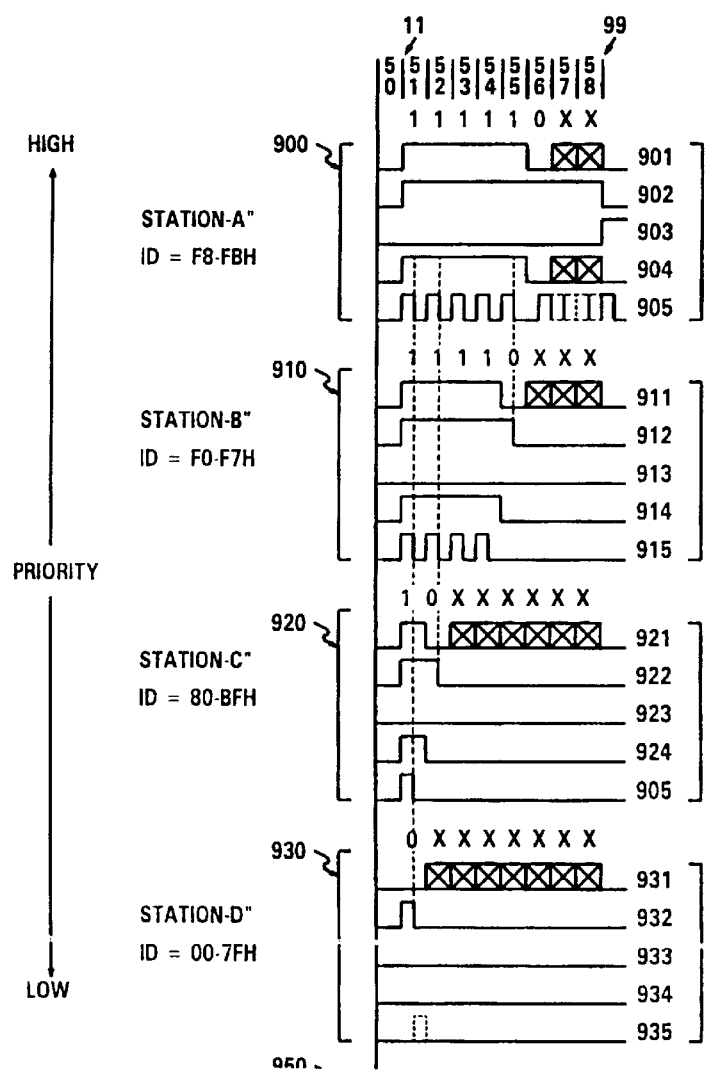
FIG. 9 is a contention timing diagram for the case when Manchester Encoding is performed.

FIG. 9 is a contention timing diagram in a case using Manchester Encoding. In the figure, stations A"(900), B"(910), C"(920), and D"(930) have the following addresses:

```
       MSB ----------> LSB 1 2 3 4 5 6 7 8

A"   1 1 1 1 1 0 x x

B"   1 1 1 1 0 x x x

C"   1 0 x x x x x x

D"   0 x x x x x x x
```

In FIG. 9, waveforms denote the following;
waveforms 901, 911, 921, and 931 denote the waveforms of the ID-address bit streams of contending stations A", B", C", and D";
waveforms 902, 912, 922, and 932 denote the ACR (404) output waves showing transmit feasible state;
waveforms 903, 913, 923, and 933 denote the bus access approved state upon identification of the highest priority;
waveforms 904, 914, 924, and 934 denote bit streams of countending stations;
waveforms 905, 915, 925, and 935 denote ID-address bit streams as DCM modulated of contending station;
waveform 951 denotes the waveform of a Manchester-modulated signal occurring on the common bus(1);
waveform 952 denotes the waveform of a local clock; and
waveform 953 denotes the waveform of a bit stream decoded from waveform 951 shown on the common bus(1);

In period 51", contention starts with MSBs. Here, since the bit values of stations A", B", and C" are '1's, and that of station D" is '0', the first three stations continue their contention and station D", having a lower priority withdraws from contention.

In period 52", the ID-address of stations A"(900), B"(910), and C"(920) are shifted to the left by one bit. Thus, the second bits are compared one to another. Since stations A", B", and C" have bit values of '1', '1', and '0', respectively, stations A" and B" remain in contention, and station C" withdraws from contention.

In period 53", the third bit values of stations A" and B", contending with each other, are both '1's. Therefore, there is no withdrawal in this period as in previous periods. In period 54", there is no withdrawal either, since contending bit values are both '1's.

In period 55", station A" has a bit value '1', and station B" has a bit value '0', this station B is eliminated from the contention. In period 56" and subsequent periods, the station that has gone through the procedure to the final period 58", i.e., LSB period, obtains the exclusive access to the common bus. Therefore, the waveform of the common bus signal (951) coincides with Manchester-modulated waveform(905) of station A" completely. Thus, station A" gains access to the common bus upon termination of the bit comparison process for all bits.

6. Tri-Level Modulation

Figure 10A:
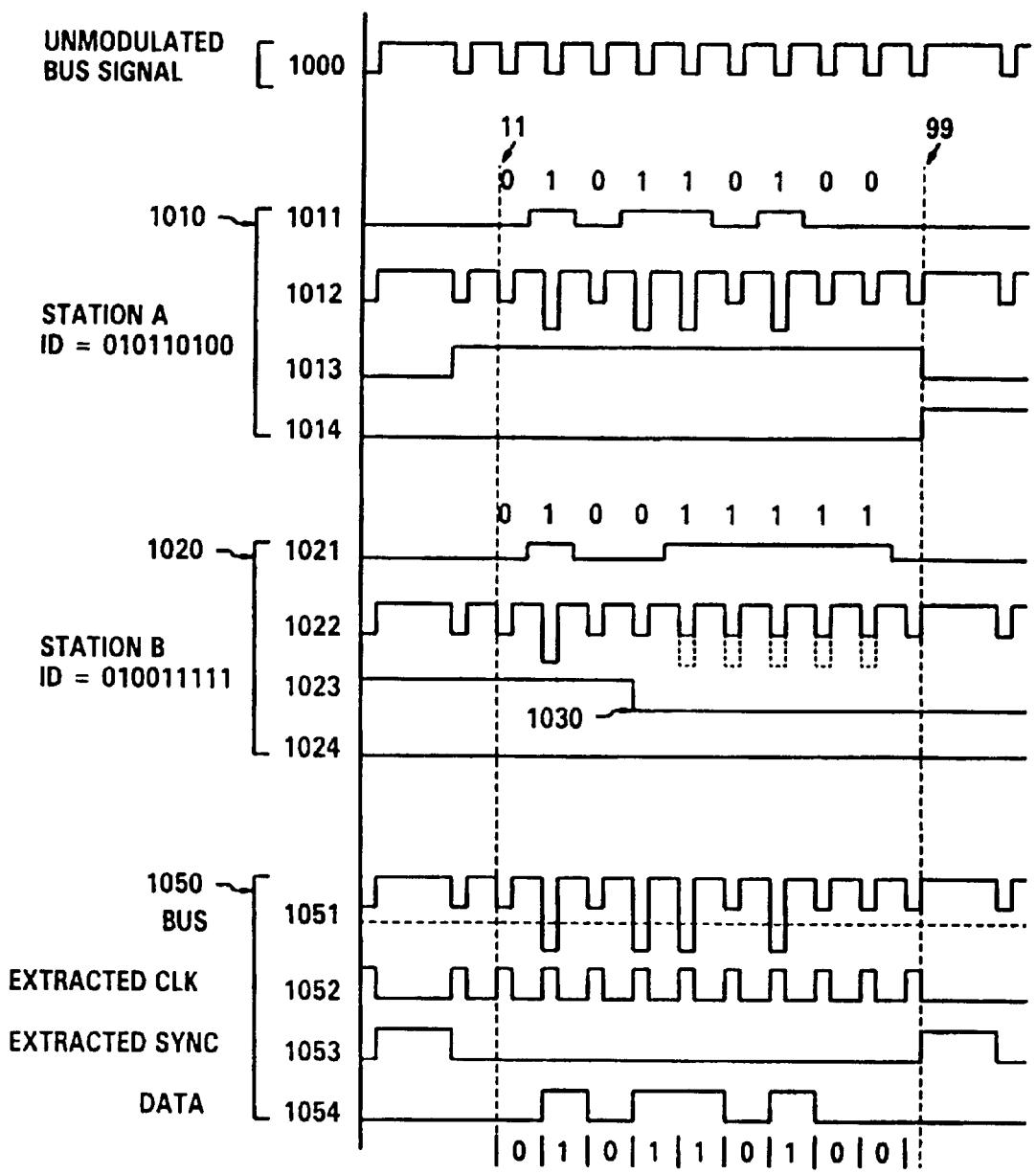
FIG. 10A is a contention timing diagram for the case when Tri-Level Modulation is performed.
Figure 10B:
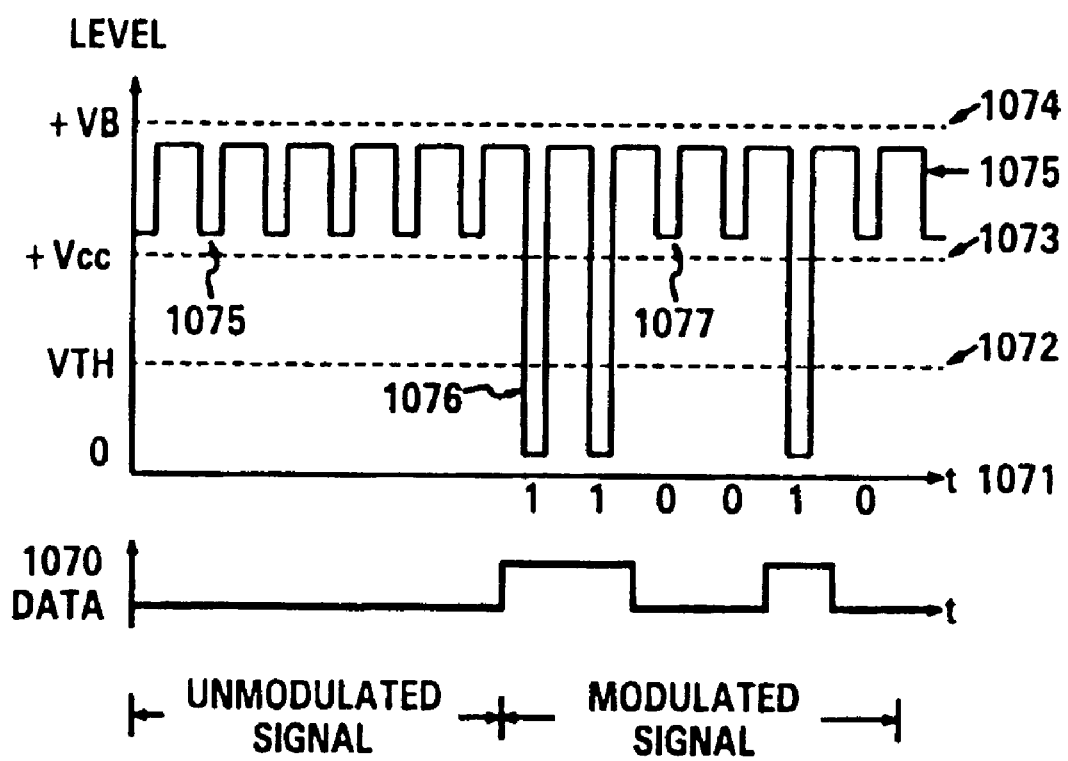
FIG. 10B is a example of Tri-Level Modulation.
Figure 11A:
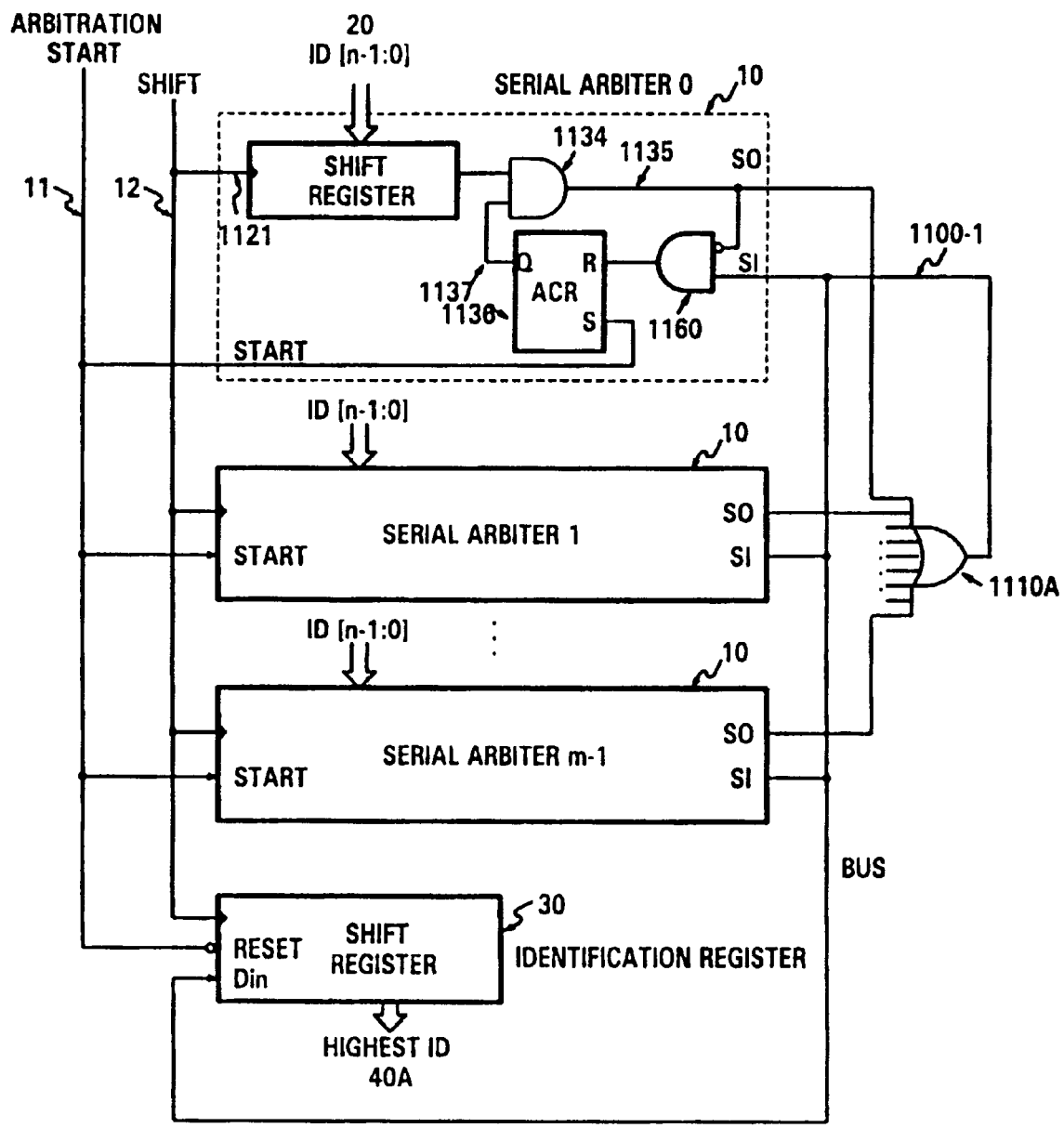
Figure 11B:
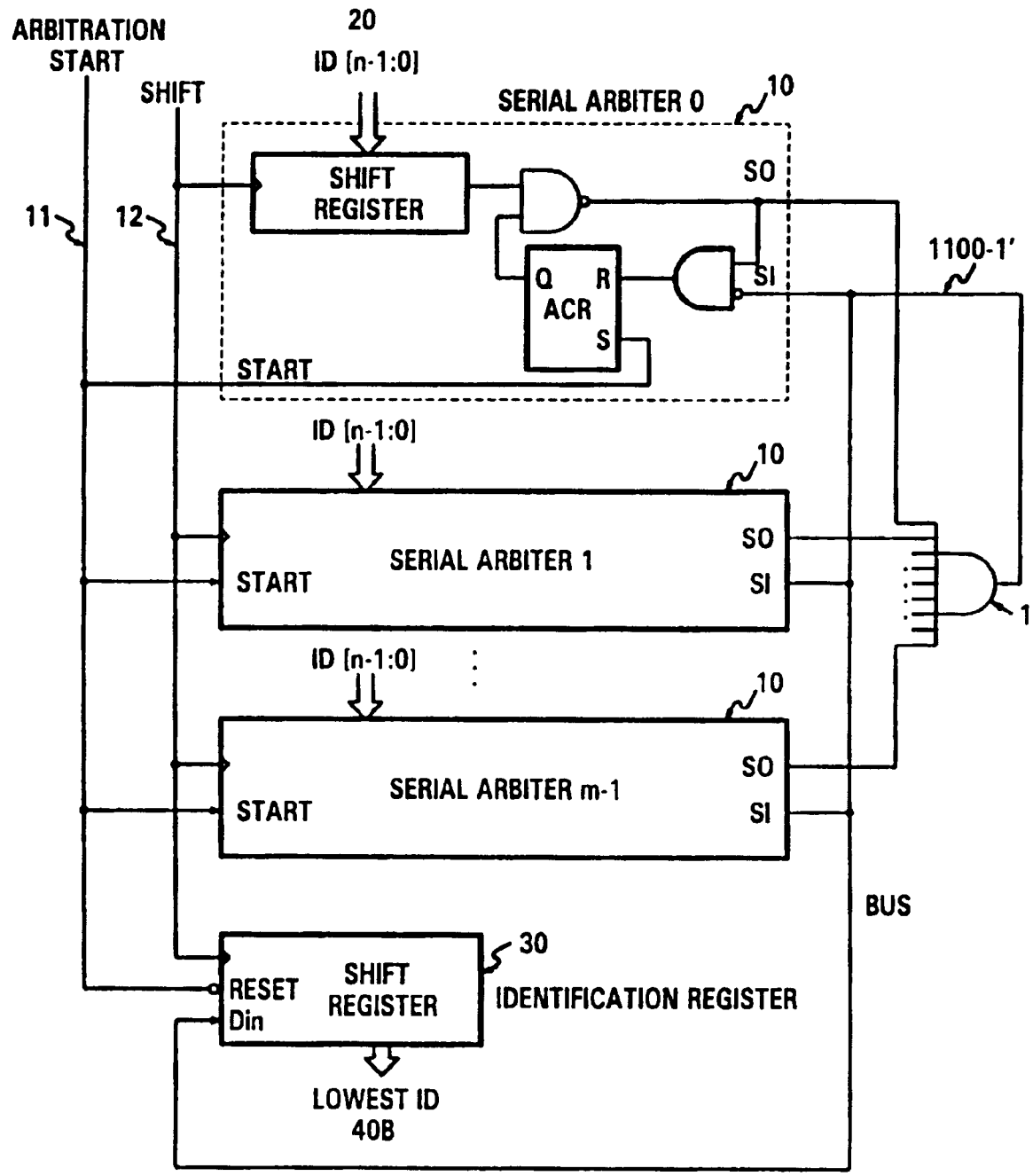

FIG. 10 is a contention timing diagram in the case of transmission of addresses and data modulated using Tri-Level Modulation(TLM) method. In the TLM system of transmitting address and data, a shifted DC-level. mixed waveform(1050) including a clock, a synchronous signal, and power is sent to the common bus from a single signal generator (2100). Then, each station extracts and divides these signals to be used for modulation and demodulation, so that all stations may share the clock and the synchronous signal.

In FIG. 10A, waveforms denote the following;
waveforms 1012, and 1022 are TLM modulated waveforms of stations requesting bus access;
waveform 1051 denotes the waveform of a TLM signal occurring on the common bus;
waveform 1052 denotes the waveform of a local clock extracted from waveform 1051 occurring on the common bus,
waveform 1053 denotes the waveform of a bit stream decoded from waveform 1051 occurring on the common bus; and
waveform 1054 denotes a bit stream of station A's ID-address as decoded from a TLM waveform 1051 which appears on the common bus.

Bus access contention of FIG. 10 is implemented in the same manner as that of FIG. 9 except for the method for modulating addresses and data.

As in FIG. 1013, definition of logic levels for TLM for sending the clock signal on the same wire is such that state voltage levels are divided into three intervals so that the first voltage interval (1073 to 1074) is used for sending the clock , and the second voltage interval (1071 to 1073) is used for expressing the data to transmit. Logical '0' requires a voltage level higher than a threshold voltage (1072) and should exist at a voltage of at least 1073 level under normal operating condition. Logical '1' needs to exist at a voltage under the threshold level (1072). When the digital signal of 1070 is TLM modulated. the resulting waveform is 1075.

In this invention, priority arbitration is possible with ID-address according to such TLM modulation method. A waveform including a clock and a synchronous signal is as in 1000. When stations A(1010) and B(1020) contend for bus access, their ID-address waveforms are 1011 and 1021, respectively, and their TLM waveforms are 1012 and 1022, respectively. Waveforms 1013 and 1023 are output waveforms of arbitration control registers (ACR) And waveforms

1014 and 1024 show the bus access state upon identification of the highest priority.

7. Bus Arbiter

Figure 12:
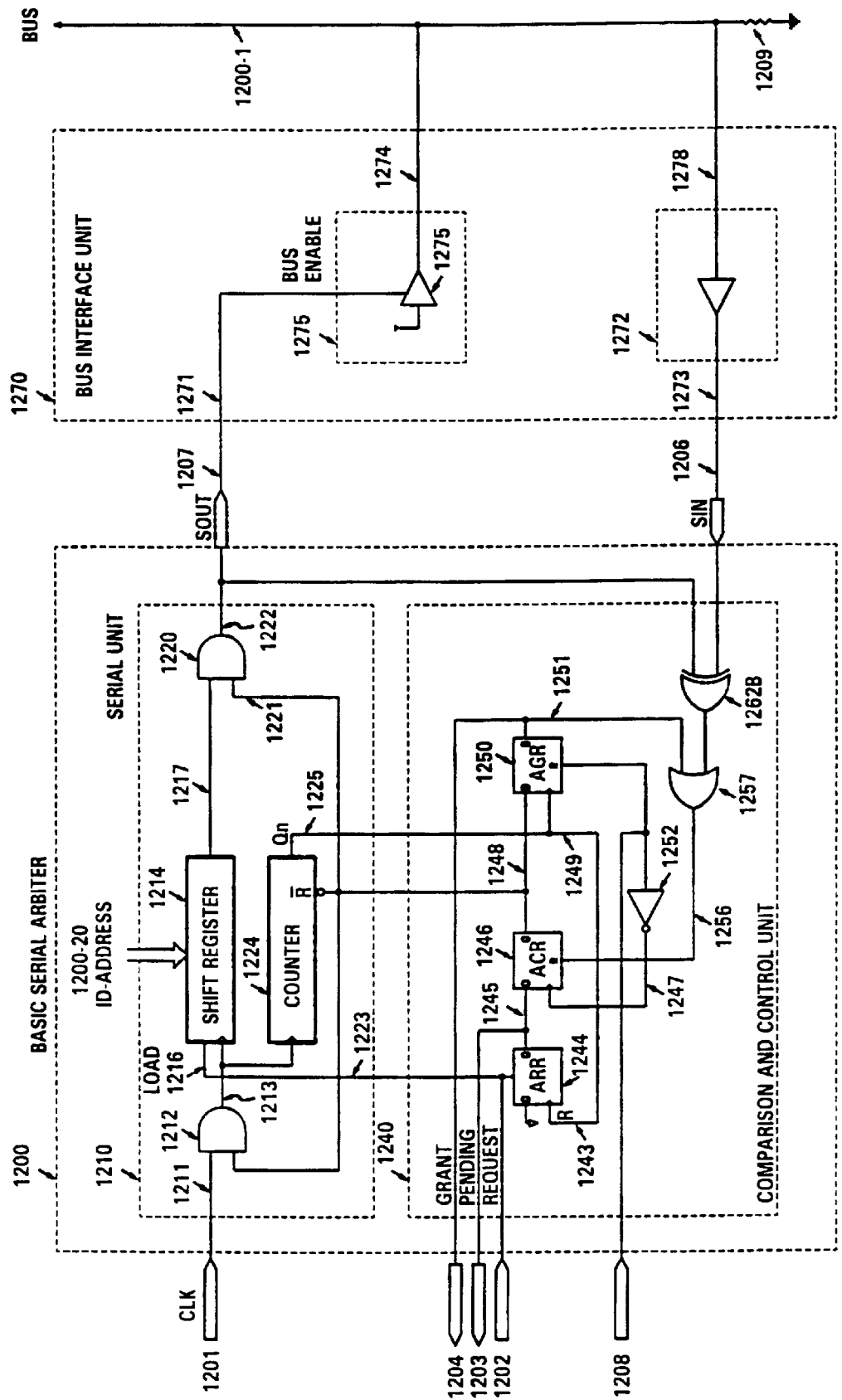
FIG. 12 is in embodiment of a basic serial arbiter according to the present invention.

FIG. 12 is a configuration block diagram of an embodiment of a serial arbiter for multipoint networks according to the present invention.

A serial arbiter for multipoint networks according to the present invention is an assembly of the following components:

- a Serial Unit(1210) that inputs the ID-address and generates a serial bit stream in accordance with the transmit clock(1201);
- a Bus Driver(1275) that receives as input bit streams from all stations and outputs the result of their wired OR operation onto the common bus; and
- a Comparison and Control Unit(1240) that verifies inconsistency of own output signal and common bus signal and controls a station's signal.

A Serial Unit(1210) consists of a shift register(1214) and a counter(1224) that counts the number of contention participation by the corresponding station.

The Bus Interface Unit(1270) in FIG. 12 is an assembly of an open-collector type bus driver(1275) and an input buffer(1272). When a logical '1' is permitted to the control input(1271), a bus driver(1275) output activates the common bus(1200-1), and the buffer(1272) inputs the common bus signal and sends it to the Comparison and Control Unit(1240).

A Comparison and Control Unit(1240) is an assembly of the following components:

- a Comparator(1257) that verifies inconsistency of the bus driver output signal(1274) and the common bus signal (1206) and generates a contention withdrawal signal when they are inconsistent;
- an ACR(1246) that controls the arbitration process; and
- an arbitration granting register(AGR, 1250) that directs arbitration approval/disapproval.

When an arbitration request signal(1202) is received, it sets the ARR(1244) and loads the corresponding ID-address (1200-20) onto the Serial Unit(1210). The ARR output (1241) is permitted as input to the ACR(1246). The arbitration initiation signal(1208) makes the AND gate(1212) operable, releases the reset condition of the counter(1224), supplies a clock signal(1213) to both a shift register(1214) in the Serial Unit and the counter(1224), and a contention process initiated.

When contention starts, the said contention process is repeated from MSB to LSB for the ID-address(1200-20) stored in the shift register(1214). If the contention process is completed to the LSB position for a station, the AGR(1250) is set and generates a bus access approval signal(1203).

In the above process, when a signal inconsistency is verified by the comparator(1262), a contention withdrawal signal(1256) via an OR gate(1256) resets the ACR(1246) so that clock signal supply is inhibited to the shift register (1216) and the shift counter(1224) is initialized, control input of the bus driver(1241) is disabled, and its output to the common bus is inhibited.

In a bus arbitration system(FIG. 1A), a station becomes a bus master from the instance the above approval signal (1204) is secured and the station can exercise the common bus access.

In an interrupt arbiter(FIG. 1B), a station's ID-address only is sent to a central controller which performs the subsequent interrupt processing and a station by itself does not normally control the common bus.

In the priority identification according to this interrupt mechanism, a serial interrupt system is feasible by decoding the ID-address that appears on the common bus of the serial arbiter(150).

Figure 13:
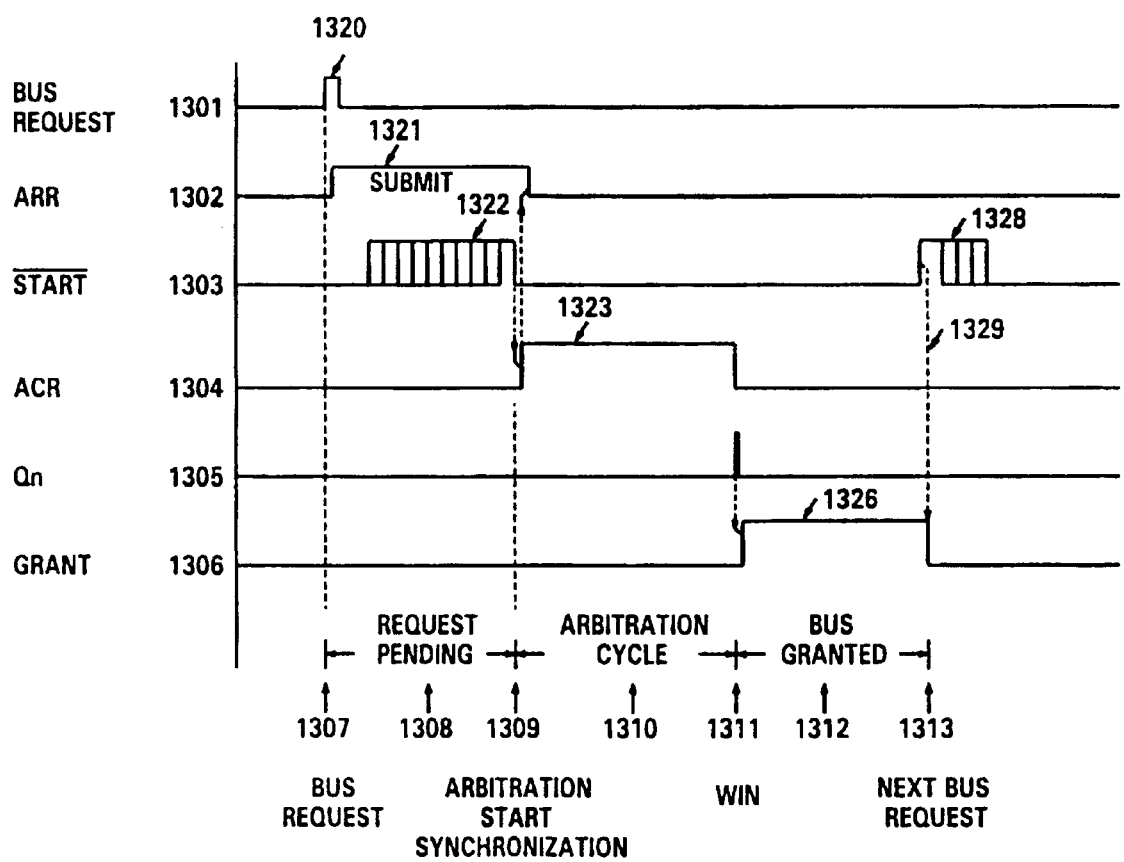
FIG. 13 is a timing diagram of a serial arbiter according to the present invention.

FIG. 13 shows a timing diagram of the bus arbitration operations according to the present invention shown in FIG. 12. The diagram shows the three processes of common bus request, arbitration, and bus access approval.

An arbitration request signal(1320) is input to an arbitration request input terminal(1301) and an ARR(1221) is set. While the ARR is set, an arbitration initiation signal (1303) is generated either by this station or elsewhere. At the trailing edge of this pulse, all requesting stations enter an arbitration process(1310). The arbitration process is such that own signal is output to the common bus, connected to this signal via a wired logic, sequentially from MSB, then feedback to compare own signal with the bus signal. If they are found to be inconsistent, said station withdraws from bus contention. This process is repeated so that the station that has completed the process to the LSB position has its shift counter(1217) output(1325) activated. This counter output signal (1325) sets the AGR(1225) and a bus access approval signal(1306) is activated.

For stations which withdraw during the process terminates the process without activating their AGRs. The station that wins the bus access right either enters a new arbitration process due to a new arbitration initiation pulse or retains the bus control right until it surrenders the bus access.

Figure 14A:
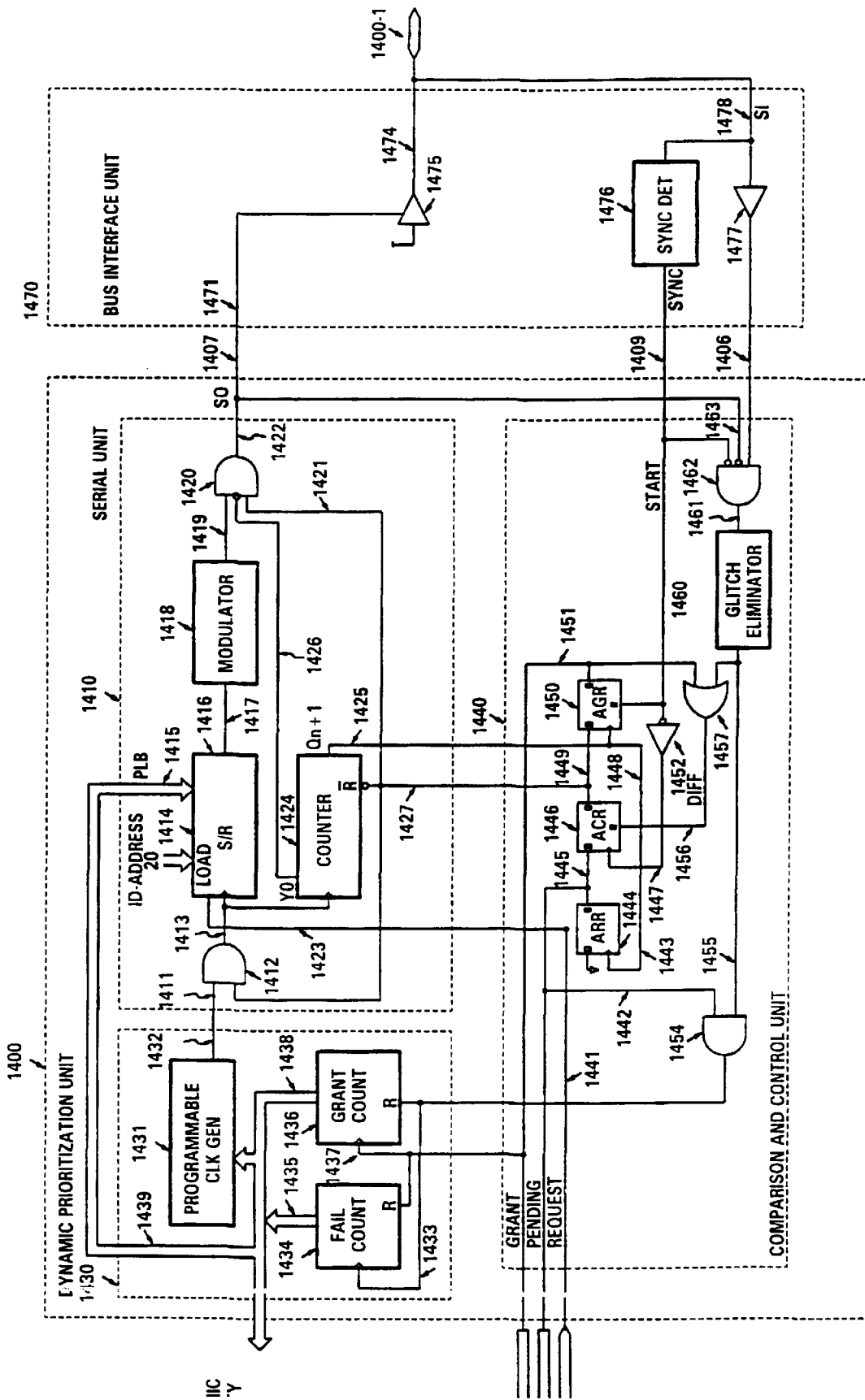
FIG. 14A is an embodiment of a serial arbiter when a modulator, a glitch eliminator, dynamic priority modifier and sync signal detector are added.

FIG. 14 is an embodiment of a priority arbiter according to the present invention that can be applied to a synchronized communication method. This embodiment has additional components to the basic arbiter of FIG. 12, such as a glitch eliminator(1460), a modulator(1418), a programmable clock generator(1431) an arbitration fail counter(1433), an arbitration grant counter(1436), and a synchronization detector (1476).

The timing diagram of FIG. 13 applies the same to the arbiter of FIG. 14 because the two arbiters perform basically the same priority identification process.

In FIG. 14, the arbiter has a modulator(1418) at the front end of the transmit driver to modulate bit streams from the Serial Unit and send them to the common bus. A glitch eliminator is effective in removing any skew such as a time delay in permitting a bus logical signal from a receive buffer to the comparison and decision unit, or any noise that can cause erroneous operations.

Also, in order to dynamically vary priority structure of stations, a programmable clock generator(1431) is used to modify transmit speeds, an arbitration grant counter(1436) and an arbitration fail counter(1433) to modify ID-address based on number of arbitration successes or failures, Also, a synchronization detector(1476) is added to separate an arbitration synchronization signal(1471) from a bus signal. Thus, an arbiter with various extra functions can be embodied.

Since the arbitration system according to the present invention uses binary values of an identifier (ID-address, in this case), we may institute a priority level code(1481, 1491) at the front edge of ID-address(1480, 1490) so that a station's priority can be dynamically modified by varying this priority level code.

Furthermore, a parity bit(1483, 1493) can be added to enable a parity checker(1495) of an arbitration monitor(40) to detect any error in ID-address signal transmission, thus enhancing communication reliability of the common bus.

Figure 15:
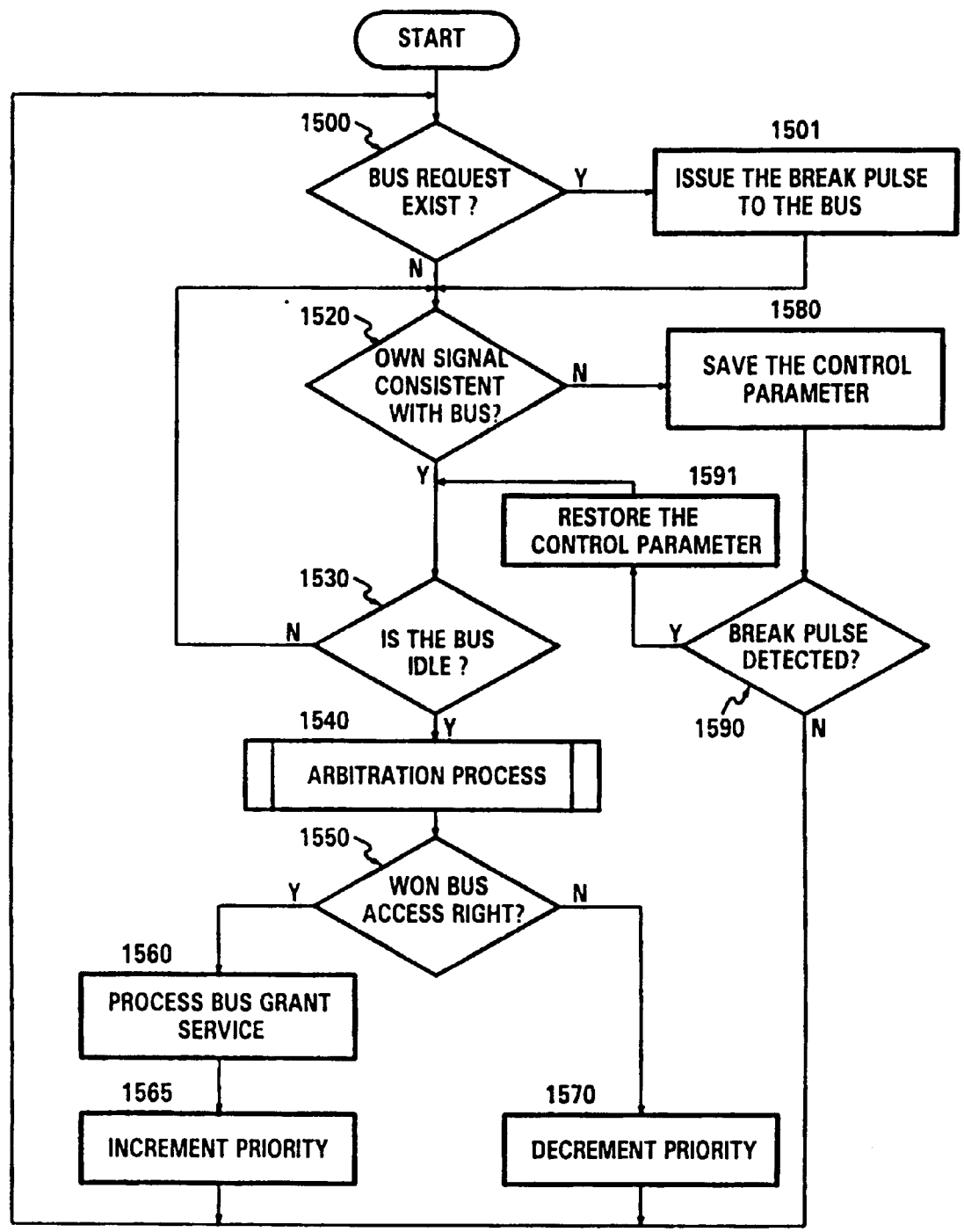
FIG. 15 is a flowchart of serial arbitration with sync signal detection and dynamic priority process.

As shown in the flowchart of FIG. 15, the priority level values of a failed station can be either elevated(1560) or down-graded(1570) so that bus access is granted evenly to all stations. This feature ensures 'fairness' in bus arbitration. The arbitration time, however, may increase somewhat by adding a priority level code to the identifier.

Also, a station's priority can be dynamically modified by varying its transmit speed so that arbitration fairness can be ensured with more than one method.

The arbiter according to the present invention identifies station priority by identity address size and assigns the bus access right to one station. Therefore, if each station transmits own binary data in conjunction with own identity address in front, then data communication among stations in a network is feasible.

When using the arbitration method according to the present invention, when a plurality of stations transmit data simultaneously. only the signal of a station with the highest priority appears on the bus. Consequently, no electric collision occurs and data communication by priority is always ensured. In any situation of bus collision, stations with lower priority (either by electrical activation begin time or activation duration) always yields the bus access to one with higher priority.

Hence, a station needs to output its break pulse that requests a bus access prior to transmitting data so that it enters bus contention by identity address with other stations that have requested bus access or is currently using the bus. At this time, a station that is using the bus may lose a contention cycle due to a lower priority. Therefore, a station that reenters bus contention in the middle of using the bus needs to preserve information on current communication status temporarily so that such information can be restored later when it regains the bus access and data transfer can be resumed from the point of a previous stop.

Figure 4B:
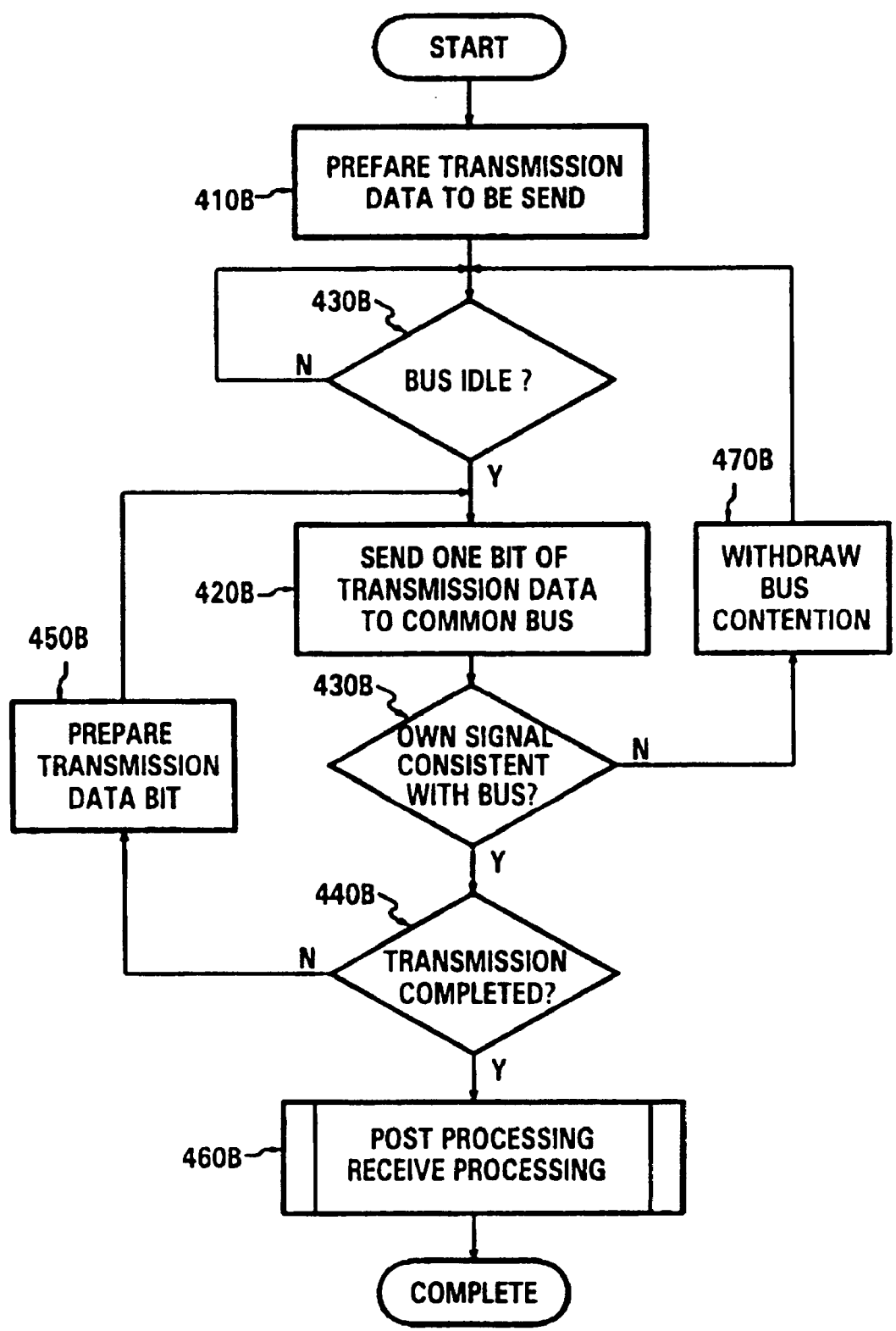
FIG. 4B is a flowchart of the sequential comparison of the serial arbitration.

The basic principle shown in FIG. 4B is similar to that shown in FIG. 4A. The difference is that comparison by identity address is a comparison of finite lengths, while, with data communication, a bus is monitored till the end of a transmission without any limit in transmission length. As shown in step 430B of FIG. 4B, data is output in place of identity address. In step 430B, a bus is monitored constantly for any conflict possibility so that all information of an arbiter is temporarily stored when a conflict situation is detected.

In the bus arbitration by identity address in FIG. 4A, bus access right is granted after n comparison cycles. In data communication, however, as priority is determined without granting a bus access right, data is transmitted continually onto the common bus. In order to process other stations' bus access requests during a bus use, a process of preserving a current communication status is needed and is incorporated in the arbitration process of FIG. 4B.

Figure 16A:
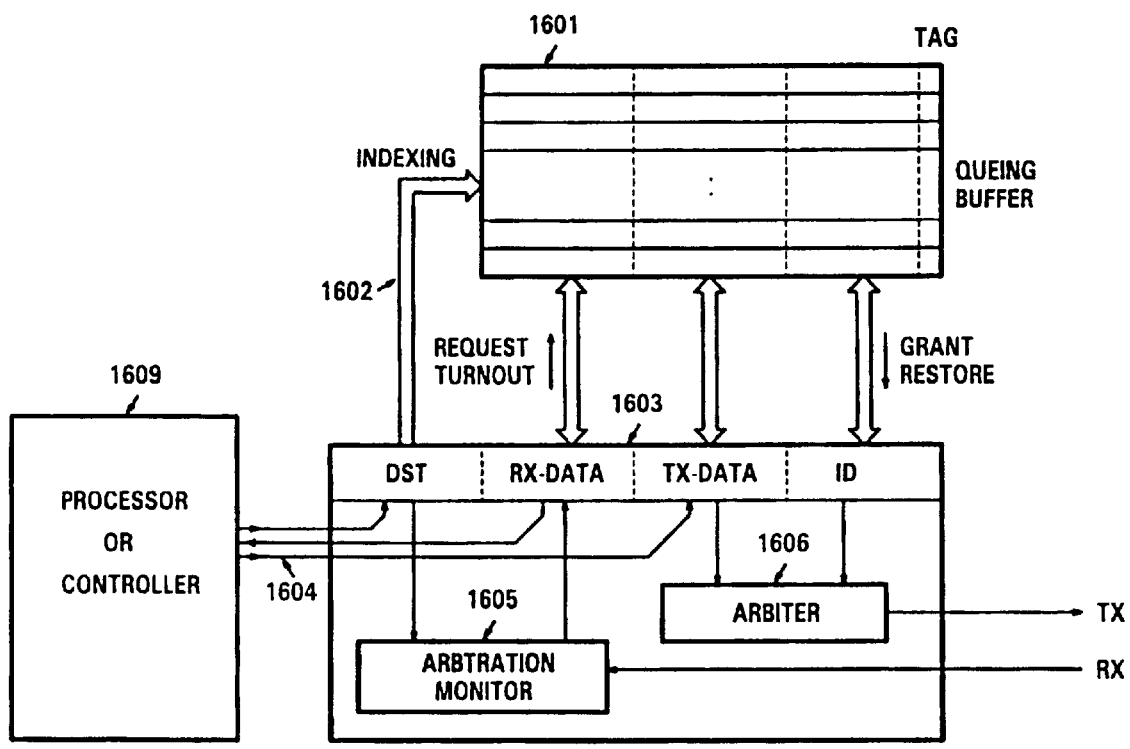
FIG. 16A is a flowchart of data communication using serial arbitration according to the present invention.

FIG. 16A is a flowchart of data communication using serial arbitration according to the present invention.

Figure 16B:
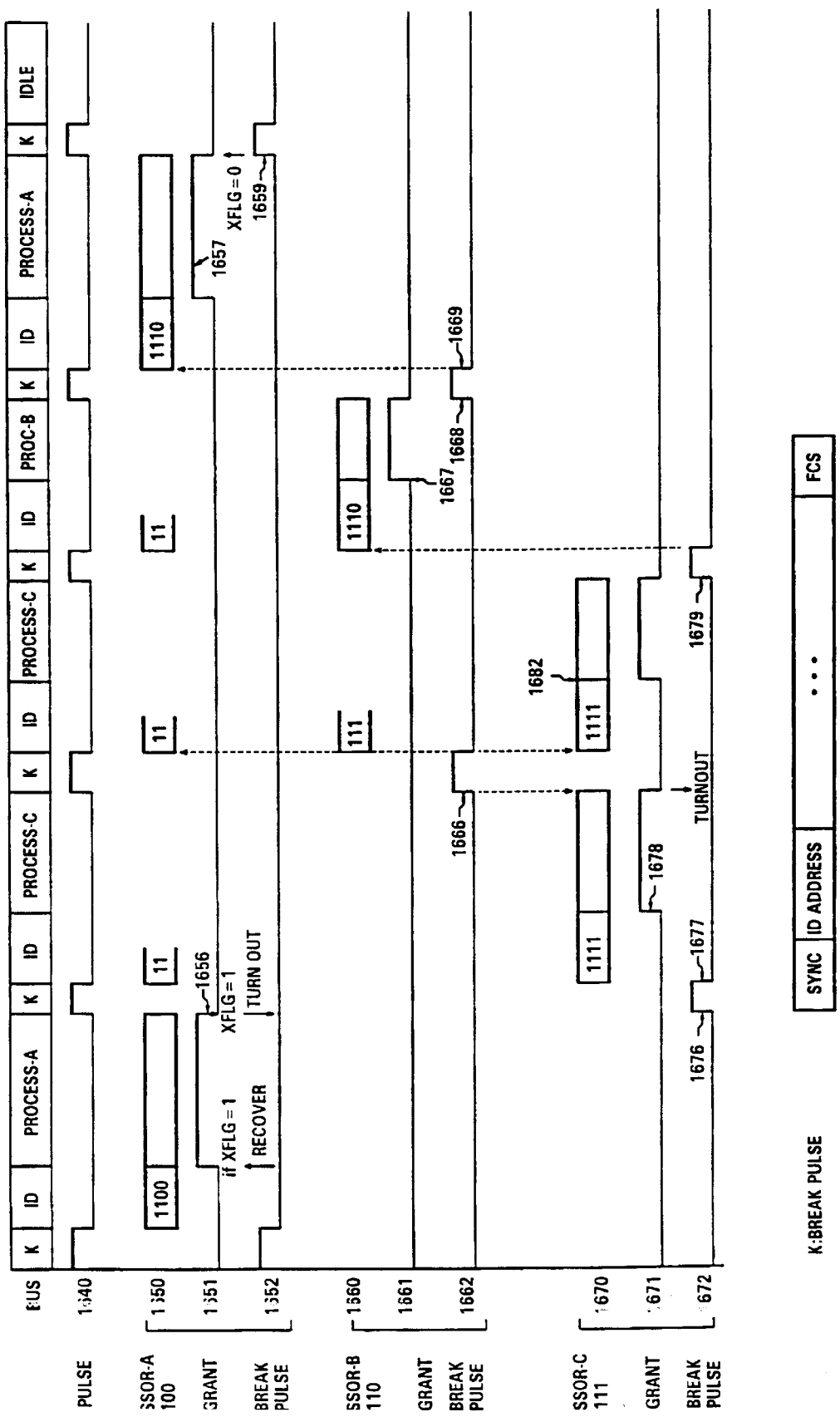
FIG. 16B is a timing diagram of bus scheduling with multiple access in data communication using serial arbitration according to the present invention.

FIG. 16B is a timing diagram of bus scheduling with multiple access in data communication using serial arbitration according to the present invention.

As shown in FIG. 16B, when break pulses(1652, 1662, 1672) from a plurality of stations(1650, 1660, 1670) that request bus access appear on the common bus, a contention cycle by identity address is to start at the trailing edge of these break pulses. In this case, however, each station is kept from activating the bus for a pulse period(1677) of a specified duration (e.g. one bit time) that is proportional to each station's data rate in order to detect a response due to data rate differences.

Therefore, after keeping all stations in a standby state using break pulses for a pause period, stations reenter contention(1679) by identity address so that all stations may participate in bus contention whether said bus is currently being used or not.

All stations in network sends break pulse(1652, 1662, 1672) requesting the use of common bus and must contend with other stations by ID-address.

In the case of appearance of break pulse(1676) in the use of the common bus(1676), the station using the common bus must save the present state of communication(166) information, and must have the pause time for a moment (1677), then all the stations requesting the use of common bus contend with each other by ID-address. After that process the station having the highest priority obtains the common bus access(1678).

Terminating the data communication, the station load the break pulse(1679) as a sign of finishment. And there are another contension between the stations requesting to use the common bus.

When the arbiter proposed in the present invention is used for data communication, when data conflict occurs during a station's data transfer due to another station's transmission, a simpler and faster data communication without losing a single bit of data is feasible, compared to prior software processing methods such as CSMA/CD and CSMA/CA where one data packet is discarded and retransmit is attempted after a certain time period. Also, in the case of an interference during a data transfer, information on interference occurrence time, the station that was using the bus when this happened, and the access termination time can be obtained. In summary. the arbiter according to the present invention as applied to data communication has the following properties:

- the functions of communication information preservation and restoration mechanism can be implemented as hardware;
- when communication is resumed according to a specified rule, communication data can be restored without any loss;
- transmit station switching is feasible with a minimum overhead time; and
- stations may enter an arbitration process during data transfer by another station.

8. Interrupt Arbitration

Figure 17:
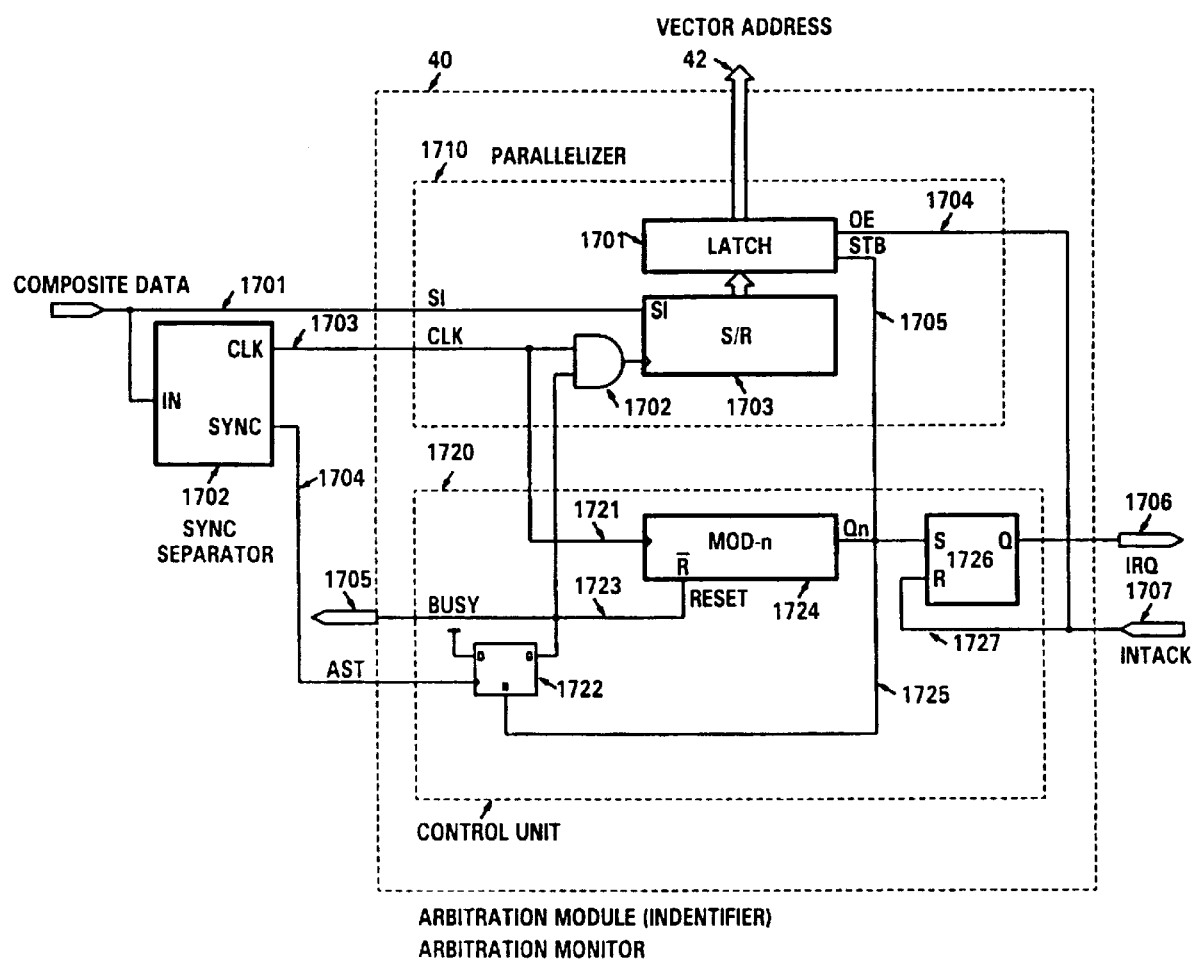
FIG. 17 is an embodiment of an interrupt arbitration module according to the present invention.

FIG. 17 is a block diagram of an interrupt arbitration module which is an embodiment of a serial vector interrupt system as expressed in FIG. 1B by adding an interrupt arbitration module(arbitration monitor, 40) to a multipoint network.

The identifier of the station that wins bus contention can be obtained front the common bus(1). By adding an interrupt arbitration module(40, 1700) that can decode this information so that the ID-address of the station that wins bus convention can be obtained and an interrupt vector(42) can be extracted from this value. Thus, a vectored interrupt processing is possible in serial bus system.

The serial interrupt system of FIG. 1B which is composed of serial arbiters according to the present invention has the following characteristics:

1) The system can be expanded in number of stations in a multi-drop form without requiring changes in its basic structure. (For an N-bit ID-address, the maximum possible number of interrupt requests is 2 N.)
2) A serial distributed interrupt encoder can be constructed.

3) Vectored interrupt processing is possible on a plurality of remotely located stations.

A serialized form of ID-address appears on the common bus. Therefore, the station with bus access can be identified from any node on the bus. Accordingly, with an interrupt controller, an ID-address corresponding to a vector is obtained. Therefore, a vectored interrupt controller can be constructed by using a serial-parallel converter.

Figure 18:
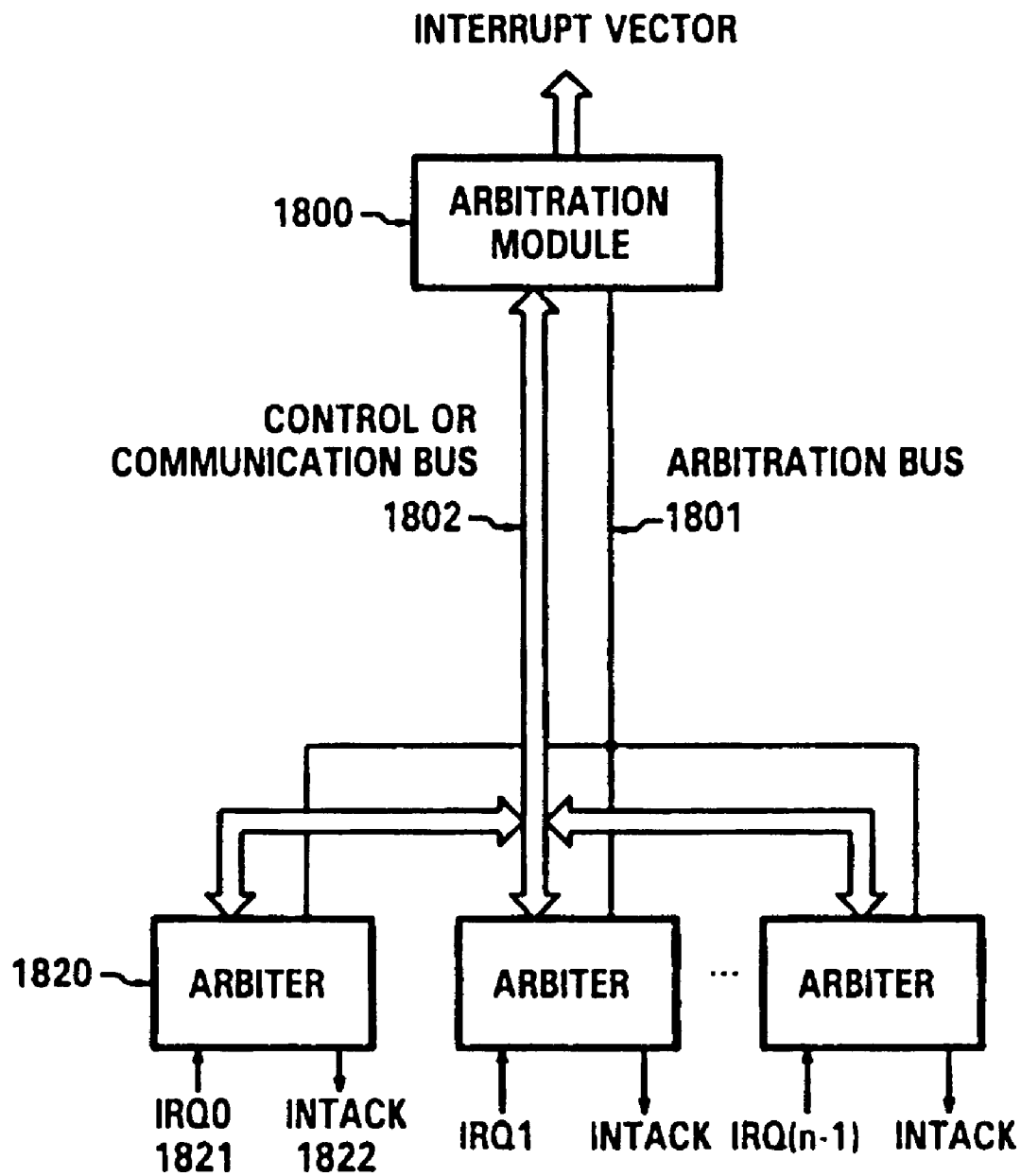
FIG. 18 is an embodiment of interrupt arbitration network with an independent control line and a centrally provided clock signal.

FIG. 18 shows an embodiment wherein communication is possible without a local clock and both a clock and data can be sent from a main controller via a single communication line. This structure that uses a natural binary line and does not require any modulation, can be widely utilized for a number of applications such as interface chip designs.

Here, interfacing is possible with a single line and an almost compatible system can be obtained in terms of functions and performance except a slight speed problem, compared with parallel buses.

Each station consists of an arbiter according to the present invention, a tri-state buffer, an interface synchronizer, and a clock separator. Stations do not require any local clock generator. Instead, a single clock synchronizes the entire system. Hence speed modulation is not feasible.

Figure 19:
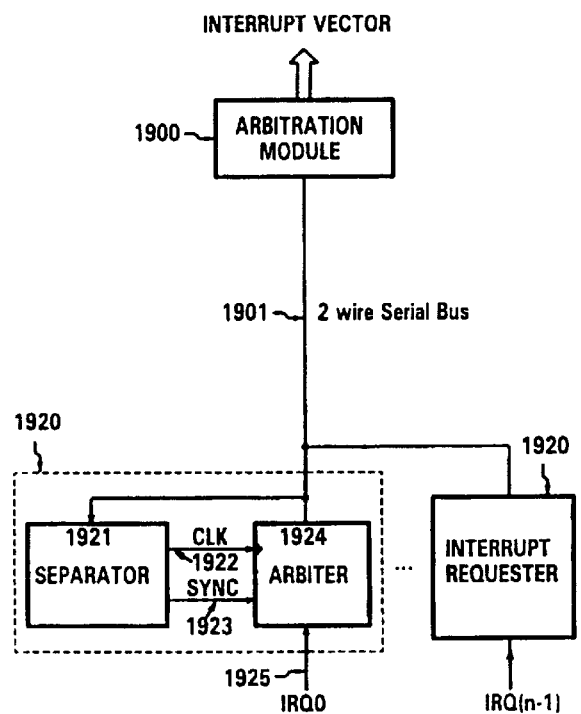
FIG. 19 is an embodiment of an interrupt arbitration network with no control line, a centrally provided clock signal, and each station requiring a separator.

FIG. 19 shows an embodiment of an interrupt arbitration network with no control line, a centrally provided clock signal, and each station requiring a separator. This structure is good for the network of remote station because of reduced signal lines.

Figure 20:
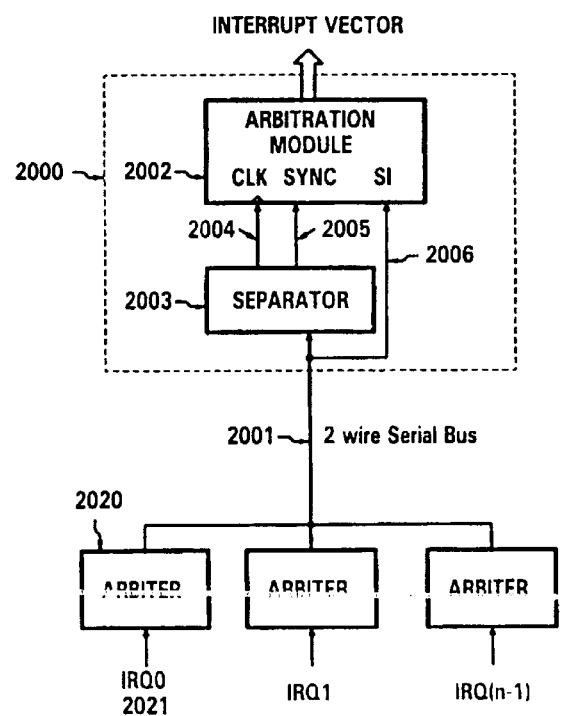
FIG. 20 is an embodiment of an interrupt arbitration network with no control line, a local clock, and requiring central separator.

FIG. 20 shows an embodiment of an interrupt arbitration network with no control line, a local clock, and requiring central separator. This structure that uses a local clock at each station, can be used for the network of remote station.

Figure 21A:
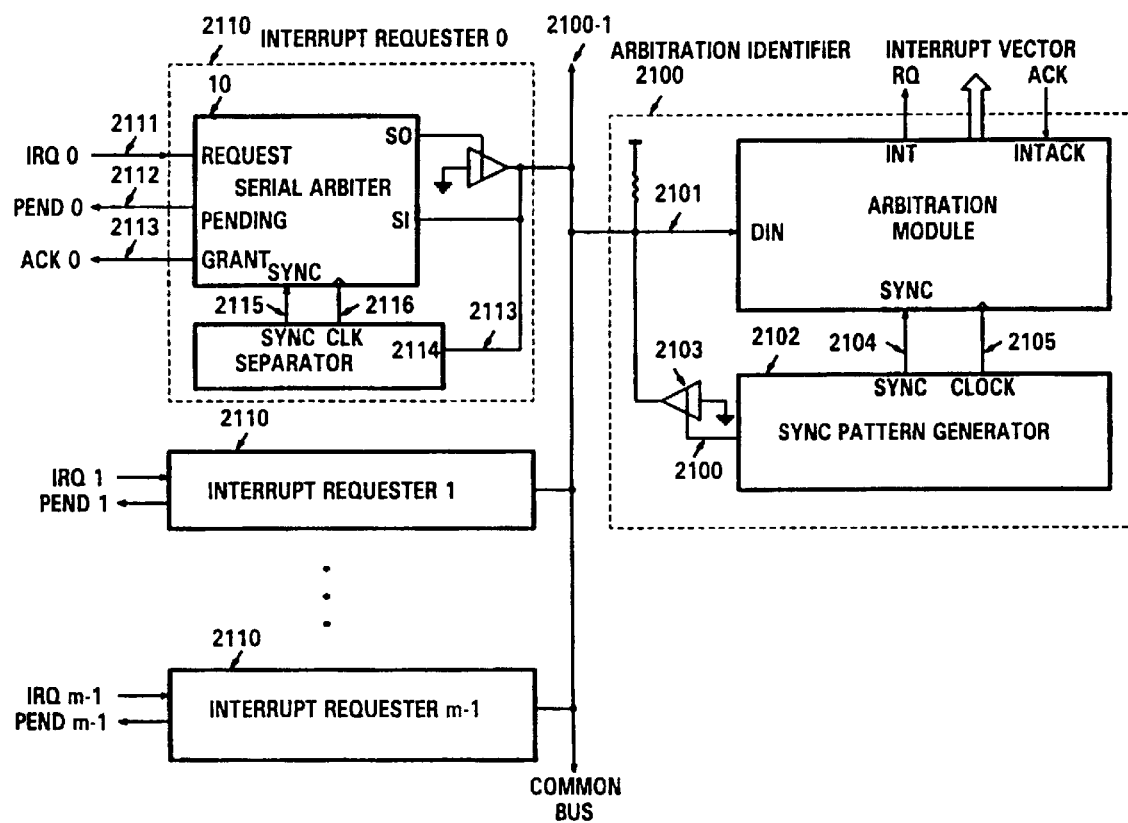
FIG. 21A is a serial arbiter embodiment with Duty Cycle Modulation with a central clock and a separator for each station.
Figure 21B:
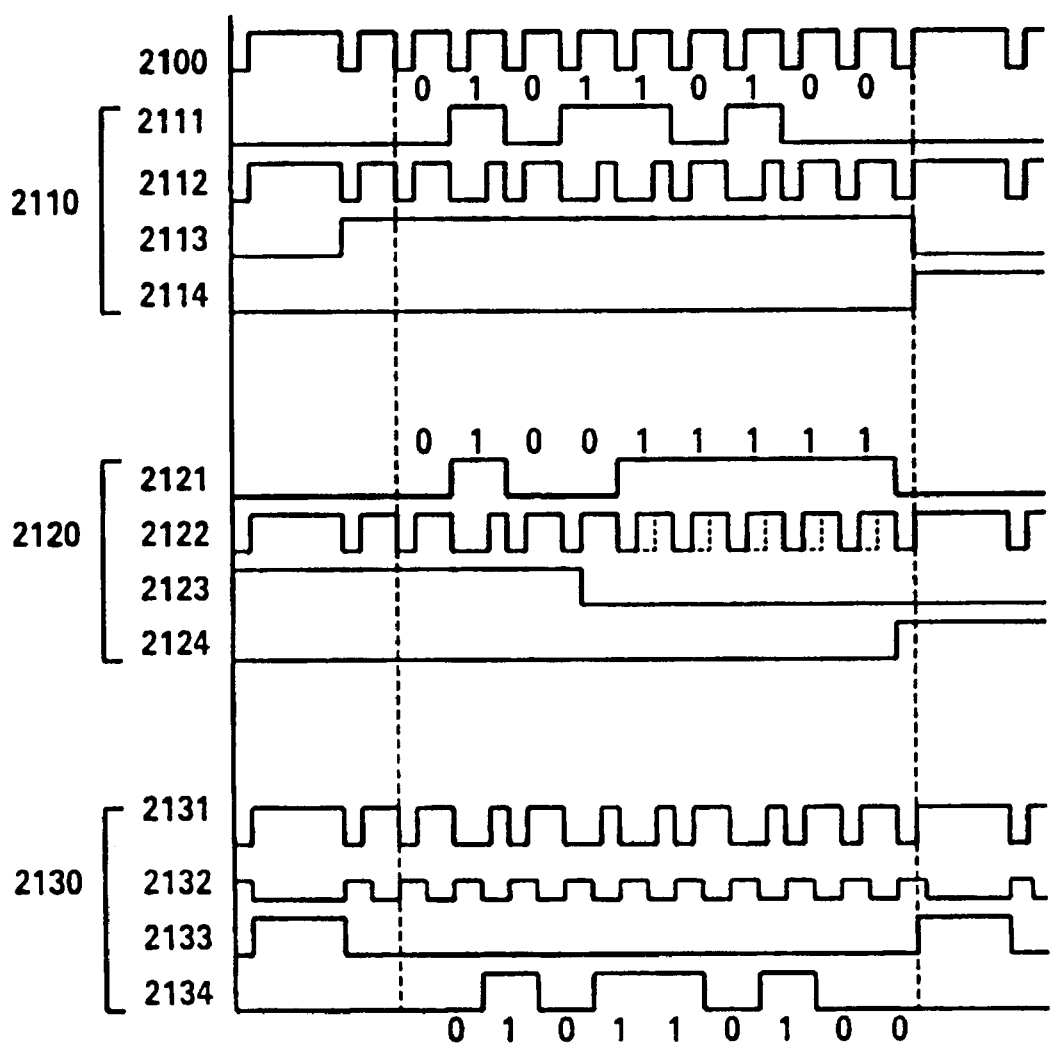
FIG. 21B is a timing diagram of a serial arbiter embodiment with Duty Cycle Modulation with a central clock and a separator for each station.

FIG. 21B is a contention timing diagram for employing the DCM method in serial bus arbitration for multipoint networks(FIG. 21A) according to the present invention. It is an embodiment of a system that is capable of supplying a clock and a synchronization signal to each station via a common bus.

A master clock/sync generator (2102) sends a mixed waveform (2100) of a clock and a sync signal to a common bus steadily.

Said mixed waveform(2100) is sent to each station via common bus in a wired AND(2103) structure. A signal separator(2114) at each station receives a modulated waveform from the common bus and separates a sync signal and data. Thus each station uses only a signal seprator(2114) to form an arbiter for a serial common bus without requiring separate signal generators for local clock and arbitration sync signal.

9. Other Embodiments

Figure 22:
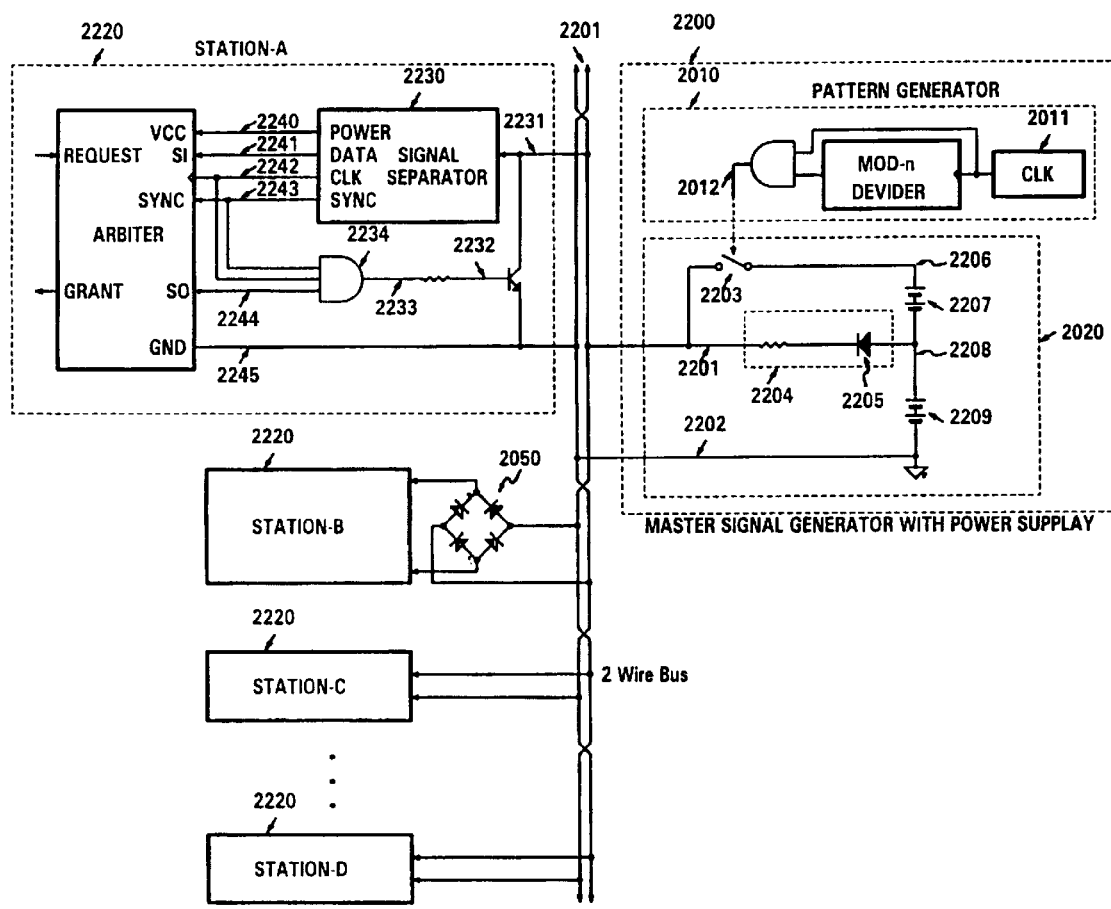
FIG. 22 is a serial arbiter embodiment using Tri-Level Modulation with a central clock and a separator for each station.

FIG. 22 is an embodiment of an arbiter which uses a TLM modulation wherein clock(2011), sync signal(2012) and power(2020) are mixed by a signal generator(2010) so that a serial level shifted mixed waveform(2201) is sent to common bus and each station again extracts components from this mixed signal, so that each station does not require separate generators for clock, arbitration sync signal, and power.

FIG. 10A is a timing diagram when the TLM method is employed in a serial bus arbitration for multipoint networks. This figure shows that power can be supplied to each station via a common bus.

Since the clock signal sent via a single wire synchronizes the entire system, priority modification using speed variation is not feasible.

Figure 23:
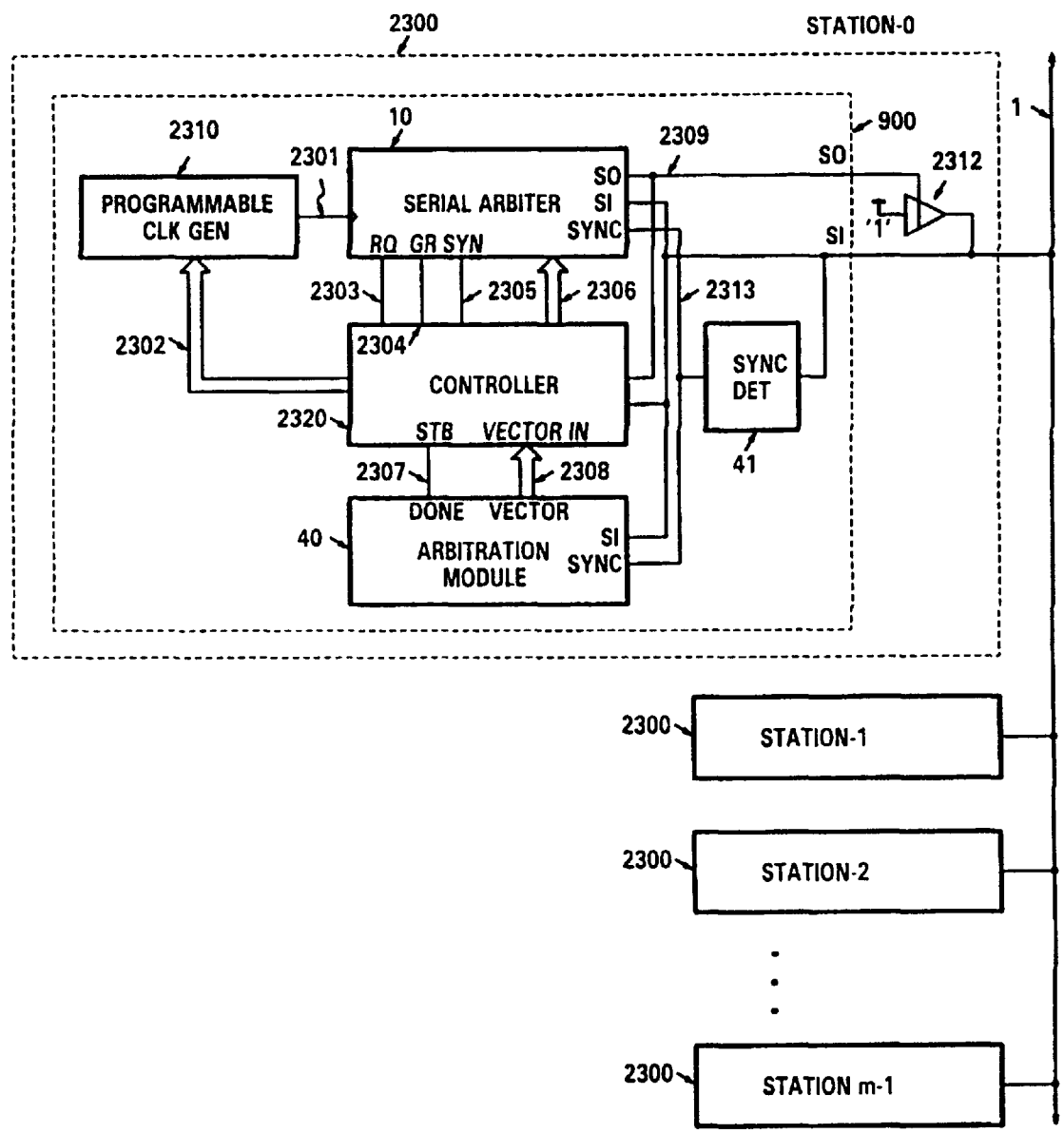
FIG. 23 is an embodiment of stations with an arbiter and an interrupt arbitration module.

FIG. 23 is an embodiment of a mixed type arbiter wherein each station has both an arbiter and an arbitration module.

Figure 24:
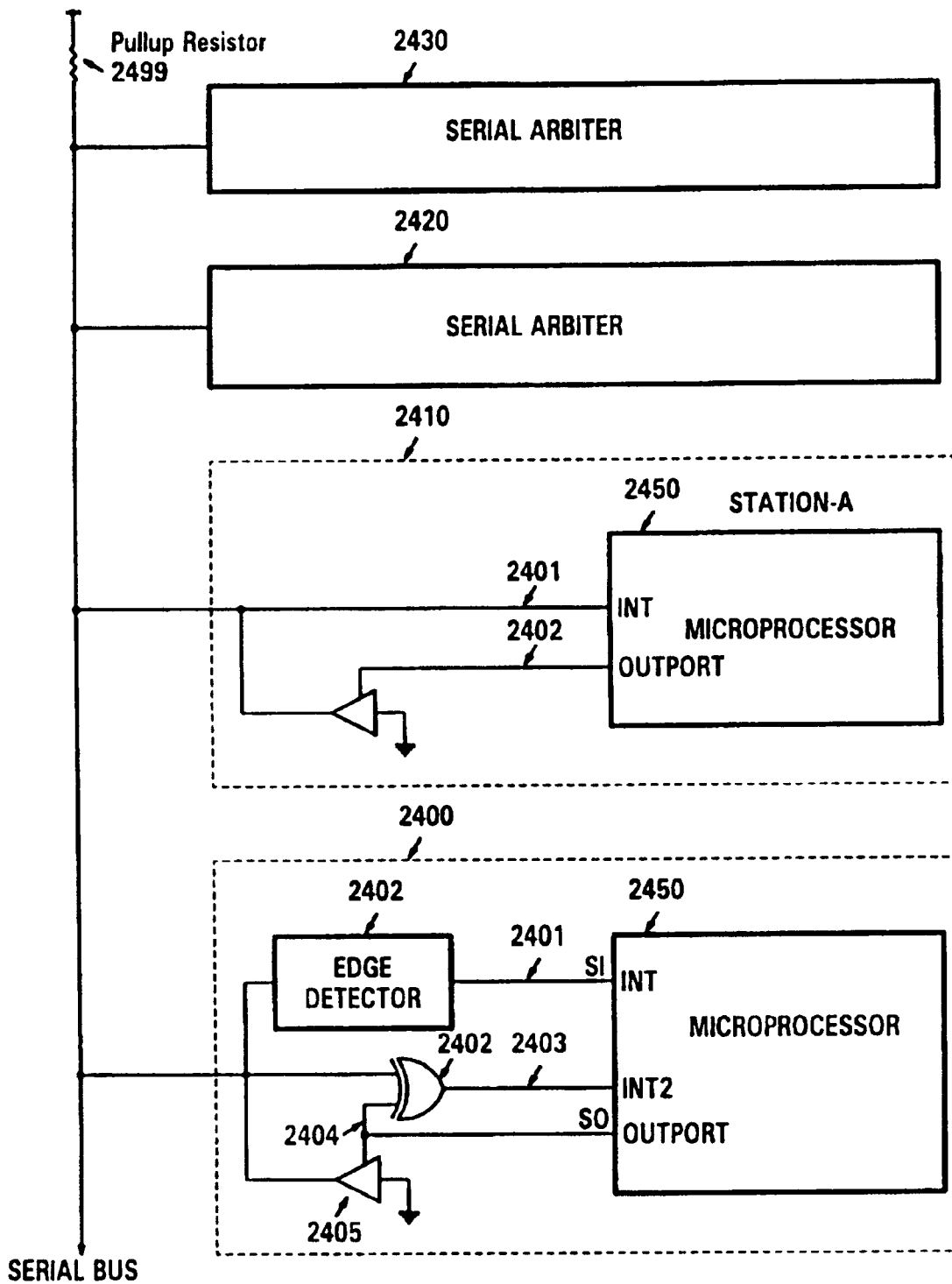
FIG. 24 is an embodiment of a mixed arbiter with a microprocessor employing both hardware and software approaches.

FIG. 24 shows an embodiment of a serial common bus arbitration according to the present invention when DCM method is used. This example shows that when a station connected to common bus has a microprocessor, arbitration processes of comparison, modulation, and contention are possible by a microprocessor without a separate hardware. Each station's microprocessor effectively uses an interrupt input to detect signal changes and uses an internal hardware timer to generate accurate times for transmitting signals to the common bus. The edge detector (2402) takes the common bus signal and outputs its changed portion only.

Therefore, serial arbitration is possible using an apparatus which employ both hardware and software approaches for performing the abitration processes of comparison, modulation, and contention. An embodiment using a microprocessor may experience somewhat slower speed but provides a convenient serial arbiter without any dedicated exterior hardware.

When the Comparison and Control Unit(1220) of FIG. 12 is used for the comparison process of arbitration, a microprocessor's software processing load of monitoring the common bus is reduced, thus enabling a more efficient arbitration processing.

FIG. 25 is an embodiment of a serial bus arbiter with a differential line driver to employ in a long-distance wire communication with an improved noise immunity characteristic.

10. Conclusion

In the priority arbitration method according to the present invention, a station sends its identity address sequentially onto a common bus (1), then feeds back the common bus signal to compare it with own signal so that if they are not consistent, said station withdraws from bus contention. This process is repeated for all address bit position until a station with the highest priority is identified. As for the criterion of judging signal consistency for identifying the highest priority, two signals are viewed as consistent if their state change time points are identical although their states are mutually inverted.

In the present invention, an decision criterion is employed so that two signals are judged to be inconsistent if the common bus signal is not identical to a station's identity address, then said station withdraws from bus contention.

According to Boolean algebra or DeMorgan's Theorem, any logical function has duality. The concepts of the present invention can be implemented as its duality and a plurality of other variations can be embodied. These are all considered identical to the concepts according to the present invention. As examples, for ways of bus combination, a 'NOT' operation can be added to the logical 'OR' operation to convert to an 'AND' operation, and the 'OR' operation can be inverted to convert to an 'AND' operation. Thus, the wired 'OR' operation according to the present invention can be implemented with a wired 'AND.'

Furthermore, other embodiments of the concept according to the present invention which use other means of different physical nature or use different elements but produce the same physical functions, are considered identical, Some examples of such a nature are using various electrical elements such as a tristate buffer, a transistor, an FET, a switching device and others for the bus driver; using other physical energy media such as electromagnetic wave, ultra-violet wave, optical wave and others in place of electrical elements; using wireless or fiber-optic bus in place of wire bus; and using electromagnetic wave or optical wave in place of electrical signals as transmit medium. Such a concept of using other substances with identical functions is well known. Therefore, embodiments of such variations are not included in this invention but are considered the same as those presented in the present invention.

11. Epilogue

As described above the present invention is directed towards a distributed serial arbitration system for multi-point networks where a plurality of bus access requests are made simultaneously by stations contending to use the common resource bus.

Only four modulation methods are cited for the present invention. However, any expert skilled in the art may understand without difficulty that other modulation methods can be employed in place of those cited herein to perform similar arbitration functions as specified in the present invention.

While but a few embodiments of the present invention have been disclosed, it will be obvious to those skilled in the art that variations and modifications may be made therein without departing from the spirit of the scope of this invention as claimed.

What is claimed is:

1. A priority arbitrating method wherein the priority varies dynamically according to the transmission rates in the multipoint networks with different transmission rates, comprising:
   (a) a common serial bus for arbitration and communication;
   (b) a plurality of stations wherein each station has a unique identity address and independent transmission rates and each station is connected to said common serial bus for transmitting and receiving information wherein the arbitration process of all stations is performed simultaneously in the following steps:
      (1) modulating said identity address and local transmission rate into the self clocking pulse (811, 821, 831, 870, 873, 905, 1012, 1022);
      (2) transmitting modulated self-clocking pulse serially onto said common serial bus;
      (3) comparing said transmitted modulated self-clocking pulse with the signal present on said common serial bus so that station is excluded asynchronously from further contending process when comparison results in inequality; and
      (4) repeating operations of the above steps (1) to (3) until the last one station is determined.

2. A priority method according to claim 1, wherein said identity address is replaced by any digital information.

3. A priority arbitrating method according to claim 1, wherein digital information is encoded into the corresponding duty-factor ratio of the self-clocking pulse that is independent of frequency, pulse width, or pulse rate.

4. A priority arbitrating method according to claim 1, further comprising:
   computing the duty factor of the self-clocking pulse on said common serial bus whenever a trailing edge of the pulse is detected, and demodulating and decoding pulse into digital information.

5. A priority arbitrating method according to claim 4, further comprising:
   separating information by asserting a strobe signal on the common serial bus whenever pre-determined pulses are counted, and extracting an interrupt vector address from said arbitration results.

6. A priority arbitrating method according to claim 4, further comprising:
   an activating signal, the width of which is longer than the period of the minimum transmission rate, is regarded as a break pulse, and a plurality of stations are allowed to contend at the trailing edge of said break pulse, so that said pulse is used as an arbitration start signal.

7. A priority arbitrating method according to claim 4, further comprising:
   regarding abnormal signals that deviate the specified duty factor as a break pulse, so that said pulse is used as an arbitration start signal.

8. A priority arbitrating method according to claim 1, wherein a composite signal that combines power, clock signal, synch signal, and data to transmit is sent via a single line in order to simplify both the arbitration process and the associated electrical circuitry, so that the composite signal is separated at each of said stations.

9. A priority arbitrating method according to claim 1, wherein arbitration is started after a delay time from an arbitration start signal.

10. A priority arbitrating method according to claim 1, wherein data transmitting rates are variable so that station's priorities are dynamically modified and arbitration fairness can be ensured.

11. A priority arbitrating system in multi-point networks wherein a plurality of stations are connected to a common serial bus where the system comprises:
   (a) means for modulating information and transmission rate into a modulated self-clocking pulse;
   (b) means for transmitting the modulated self-clocking pulse serially onto said common serial bus;
   (c) means for comparing said transmitted signal with a common bus signal, and;
   (d) means for inhibiting a station's signal to said common serial bus when said comparison result shows signal inconsistency so that said station is excluded asynchronously from further contention process.

12. A priority arbitrating system according to claim 11, wherein an identity address of a station with the highest priority is obtained from arbitration information that appears on said common serial bus and thereafter an interrupt vector is obtained.

13. A self-arbitrating data communication system in multi-point networks with different transmission rates comprising:
   (a) a common serial bus for arbitration and communication;
   (b) a plurality of stations wherein each station has a unique identity address and different transmission rates and each station is connected to said common serial bus for transmitting and receiving information; and
   (c) one arbitrating module for each station comprising;
      (1) means for modulating said information and transmission rate into the modulated self-clocking pulse;
      (2) means for transmitting said modulated self-clocking pulse onto said common serial bus;
      (3) means for comparing continuously said modulated self-clocking signal with a signal of common serial bus; and
      (4) means for inhibiting a station's signal to said common serial bus when said comparison result shows signal inconsistency so that said station is excluded asynchronously from further contention process.

14. A self-arbitrating data communication system according to claim 13, further comprises:

a single arbitration bus coupled to each station with two wires.

15. A self-arbitrating data communication system according to claim 13, wherein said arbitrating module further comprises:
   means for demodulating the information from said self-clocking pulse on said common serial bus (40, 1800, 2000, 2100);
   means for detecting an idle state of said common serial bus;
   a break pulse detector configured to detect abnormal pulse;
   a glitch eliminator configured to eliminate spike pulse; and
   means for extracting an interrupt vector from said common serial bus which is modulated into self-clocking pulse on said common serial bus.

* * * * *